(12) United States Patent
Ichikawa et al.

(10) Patent No.: US 10,680,248 B2
(45) Date of Patent: Jun. 9, 2020

(54) ELECTRODE MATERIAL, ELECTRODE OF REDOX FLOW BATTERY, AND REDOX FLOW BATTERY

(71) Applicant: SHOWA DENKO K.K., Tokyo (JP)

(72) Inventors: Masatoshi Ichikawa, Chiba (JP); Keizo Iseki, Tokyo (JP); Gaku Oriji, Chiba (JP); Kenzo Hanawa, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 163 days.

(21) Appl. No.: 15/563,013

(22) PCT Filed: Apr. 1, 2016

(86) PCT No.: PCT/JP2016/060919
§ 371 (c)(1),
(2) Date: Sep. 29, 2017

(87) PCT Pub. No.: WO2016/159348
PCT Pub. Date: Oct. 6, 2016

(65) Prior Publication Data
US 2018/0366736 A1    Dec. 20, 2018

(30) Foreign Application Priority Data
Apr. 1, 2015    (JP) .................... 2015-075358

(51) Int. Cl.
*H01M 4/70*    (2006.01)
*H01M 8/18*    (2006.01)
(Continued)

(52) U.S. Cl.
CPC ............ *H01M 4/70* (2013.01); *H01M 4/368* (2013.01); *H01M 4/663* (2013.01); *H01M 4/86* (2013.01);
(Continued)

(58) Field of Classification Search
CPC ...... H01M 4/70; H01M 4/8605; H01M 8/188; H01M 4/663; H01M 4/368; H01M 4/96; H01M 4/86; H01M 8/18; Y02E 60/528
(Continued)

(56) References Cited

U.S. PATENT DOCUMENTS

2015/0236363 A1    8/2015    Polcyn et al.

FOREIGN PATENT DOCUMENTS

| EP | 0 814 527 A2 | 12/1997 |
| JP | 61-189566 U | 11/1986 |

(Continued)

OTHER PUBLICATIONS

Zhu et al. "Graphite-carbon nanotube composite electrodes for all vanadium redox flow battery" in the Journal of Power Source, vol. 184 (2008) p. 637-640 (Year: 2008).*

(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

An electrode material including a conductive sheet containing carbon nanotubes having an average fiber diameter of 1 μm or less; a liquid inflow member that is formed on a first surface of the conductive sheet such that an electrolyte solution that is passed therethrough flows into the conductive sheet; and a liquid outflow member that is formed on a second surface of the conductive sheet and out of which flows the electrolyte solution that has passed through the conductive sheet; wherein, when using a sheet surface of the conductive sheet as a reference plane, the Darcy permeability, in an in-plane direction, inside the liquid inflow member, is at least 100 times the Darcy permeability, in a normal direction, through the conductive sheet.

20 Claims, 5 Drawing Sheets

(51) Int. Cl.
  *H01M 4/86* (2006.01)
  *H01M 4/96* (2006.01)
  *H01M 4/36* (2006.01)
  *H01M 4/66* (2006.01)

(52) U.S. Cl.
  CPC ........... *H01M 4/8605* (2013.01); *H01M 4/96* (2013.01); *H01M 8/18* (2013.01); *H01M 8/188* (2013.01); *Y02E 60/528* (2013.01)

(58) Field of Classification Search
  USPC ........................................................ 429/101
  See application file for complete search history.

(56) References Cited

FOREIGN PATENT DOCUMENTS

| | | |
|---|---|---|
| JP | 8-138685 A | 5/1996 |
| JP | 2001-167785 A | 6/2001 |
| JP | 3560181 B2 | 9/2004 |
| JP | 2006-156029 A | 6/2006 |
| JP | 2014-29035 A | 2/2014 |
| WO | 99/60643 A1 | 11/1999 |
| WO | 2011/075135 A1 | 6/2011 |
| WO | 2014/033238 A1 | 3/2014 |

OTHER PUBLICATIONS

International Search Report dated Jun. 21, 2016 issued by the International Search Authority in No. PCT/JP2016/060919.
Communication dated Oct. 15, 2018 from the European Patent Office in counterpart Application No. 16773228.8.

* cited by examiner

ELECTRODE MATERIAL, ELECTRODE OF REDOX FLOW BATTERY, AND REDOX FLOW BATTERY

CROSS REFERENCE TO RELATED APPLICATIONS

This application is a National Stage of International Application No. PCT/JP2016/060919 filed Apr. 1, 2016, claiming priority based on Japanese Patent Application No. 2015-075358 filed Apr. 1, 2015, the contents of all of which are incorporated herein by reference in their entirety.

TECHNICAL FIELD

The present invention relates to an electrode material, an electrode of a redox flow battery, and a redox flow battery.

BACKGROUND ART

Redox flow batteries are known as a type of high-capacity storage battery. A redox flow battery generally has an ion exchange membrane that separates an electrolyte solution, and electrode materials provided on both sides of the ion exchange membrane. The battery can be charged and discharged by making an oxidation reaction and a reduction reaction progress simultaneously on the electrode materials. Additionally, carbonaceous members are widely used as such electrode materials.

The supply of the electrolyte solution to the carbonaceous members is generally performed by using a pump or the like. If there is a pressure drop when passing liquid inside a redox flow battery, the overall energy efficiency of the battery decreases. For this reason, in Patent Document 1, it is described that the pressure drop can be reduced by forming grooves in the electrode materials. Additionally, Patent Document 2 describes that the pressure drop can be reduced by controlling the direction of flow of the electrolyte solution with respect to the carbonaceous members in a redox flow battery.

Various studies have also been performed on carbonaceous members for the purpose of improving battery performance. For example, in Patent Document 1 and Patent Document 2, carbon fleece and felt (non-woven fabrics) containing widely and commonly used carbon fibers (PAN-based carbon fibers) are used as the carbonaceous members. Patent Document 3 describes the use of vapor-grown carbon fibers in the electrode materials of redox flow batteries in order to improve the battery properties.

RELATED LITERATURE

Patent Documents

[Patent Document 1]
  JP 3560181 B
[Patent Document 2]
  WO 2014/033238 A1
[Patent Document 3]
  JP 2006-156029 A

SUMMARY OF INVENTION

Technical Problem

However, the redox flow batteries based on the above-described technologies have room for improvement in terms of their performance, such as the battery reactivity, electrical capacity, cell resistivity and pressure drop.

For example, Patent Document 1 and Patent Document 2 describe that the pressure drop can be reduced by controlling the flow of the electrolyte solution. However, the carbonaceous members that are used are made of felt containing commonly used carbon fibers having an average fiber diameter of approximately 7 to 16 μm. For this reason, better battery properties are sought.

On the other hand, Patent Document 3 describes the use of vapor-grown carbon fibers (carbon nanotubes) having an average fiber diameter of approximately 0.05 to 0.3 μm as the electrode materials of redox flow batteries. Such carbon nanotubes have an average fiber diameter that is about one one-hundredth or less with respect to that of a normal carbon fiber, and when molded into sheets, the sizes of voids in the sheets are likewise about one one-hundredth the normal size or less. Electrode materials using such carbon nanotubes have an extremely fine structure, and therefore have extremely poor electrolyte solution passage properties. For this reason, redox flow batteries that use sheets using carbon nanotubes as carbonaceous members have high pressure drops. In order to improve the pressure drop, configurations that suppress the pressure drop such as those described in Patent Document 1 and Patent Document 2 might be contemplated. However, in carbonaceous members that simply combine felt containing carbon fibers with sheets using carbon nanotubes, there is a significant difference in the liquid passage properties therebetween, so it is not possible to obtain adequate pressure drop suppression effects, and there is a considerably uneven distribution in the flow of the electrolyte solution within the carbonaceous members. For this reason, the reactive species substitution efficiency during the charging/discharging process is lowered, and adequate battery properties cannot be obtained.

The present invention was made in consideration of the above-described problems, and an object of the invention is to obtain an electrode material, an electrode of a redox flow battery, and a redox flow battery that has a low pressure drop and that can obtain excellent battery properties even when using conductive sheets having poor electrolyte solution passage properties.

Solution to Problem

As a result of diligent study, the present inventors discovered that the pressure drop can be decreased and excellent battery properties can be obtained by providing, so as to have a predetermined relationship, a liquid inflow member, a conductive sheet containing carbon nanotubes, and a liquid outflow member, thereby completing the present invention.

In other words, the present invention provides the following means for solving the above-mentioned problems.

(1) An electrode material according to an embodiment of the present invention comprises a conductive sheet containing carbon nanotubes having an average fiber diameter of 1 μm or less; a liquid inflow member that is formed on a first surface of the conductive sheet such that an electrolyte solution that is passed therethrough flows into the conductive sheet; and a liquid outflow member that is formed on a second surface of the conductive sheet and out of which flows the electrolyte solution that has passed through the conductive sheet; wherein, when using a sheet surface of the conductive sheet as a reference plane, the Darcy permeability, in an in-plane direction, inside the liquid outflow member, is at least 50 times the Darcy permeability, in a normal direction, through the conductive sheet.

(2) In the electrode material according to (1) above, the Darcy permeability, in the in-plane direction, inside the liquid outflow member, and the Darcy permeability, in the normal direction, through the conductive sheet, may be permeabilities that are determined by passing water at a transmission flux of 0.5 cm/sec.

(3) In the electrode material according to (1) or (2) above, the Darcy permeability, in the in-plane direction, inside the liquid inflow member, may be at least 100 times the Darcy permeability, in the normal direction, through the conductive sheet.

(4) An electrode material according to an embodiment of the present invention comprises a conductive sheet containing carbon nanotubes having an average fiber diameter of 1 μm or less; a liquid inflow member that is formed on a first surface of the conductive sheet such that an electrolyte solution that is passed therethrough flows into the conductive sheet; and a liquid outflow member that is formed on a second surface of the conductive sheet and out of which flows the electrolyte solution that has passed through the conductive sheet; wherein, when using a sheet surface of the conductive sheet as a reference plane, the Darcy permeability, in an in-plane direction, inside the liquid inflow member, is at least 100 times the Darcy permeability, in a normal direction, through the conductive sheet.

(5) In the electrode material according to (4) above, the Darcy permeability, in the in-plane direction, inside the liquid inflow member, may be a permeability that is determined by passing water at a transmission flux of 2.0 cm/sec, and the Darcy permeability, in the normal direction, through the conductive sheet, may be a permeability that is determined by passing water at a transmission flux of 0.5 cm/sec.

(6) In the electrode material according to (4) or (5) above, the Darcy permeability, in the in-plane direction, inside the liquid outflow member, may be at least 50 times the Darcy permeability, in the normal direction, through the conductive sheet.

(7) In the electrode material according to (6) above, the Darcy permeability, in the in-plane direction, inside the liquid outflow member, may be a permeability that is determined by passing water at a transmission flux of 0.5 cm/sec.

(8) In the electrode material according to (3) above, the Darcy permeability, in the in-plane direction, inside the liquid inflow member, may be a permeability that is determined by passing water at a transmission flux of 2.0 cm/sec.

(9) In the electrode material according to any one of (1) to (8) above, the liquid outflow member may be a first porous sheet.

(10) In the electrode material according to (9) above, the first porous sheet may be conductive.

(11) In the electrode material according to either (9) or (10) above, the first porous sheet may be insusceptible to corrosion by the electrolyte solution.

(12) In the electrode material according to any one of (1) to (11) above, the liquid inflow member may comprise a support member that supports the conductive sheet.

(13) In the electrode material according to (12) above, the support member may be arranged so as to form a first flow passage through which the electrolyte solution passes from a liquid inflow port formed on one end of the liquid inflow member to another end thereof; and a second flow passage, connected to the first flow passage, through which the electrolyte solution flows in a direction intersecting with the first flow passage.

(14) In the electrode material according to any one of (1) to (13) above, two or more liquid inflow members may be connected to the conductive sheet.

(15) In the electrode material according to any one of (1) to (14) above, a second porous sheet may be provided between the liquid inflow member and the conductive sheet.

(16) In the electrode material according to any one of (1) to (15) above, a third porous sheet may be provided inside the liquid inflow member.

(17) A redox flow battery electrode according to an embodiment of the present invention uses an electrode material according to any one of (1) to (16) above.

(18) In the redox flow battery electrode according to (17) above, the liquid inflow member of the electrode material may be provided on a side towards a bipolar plate, and the liquid outflow member may be provided on a side towards an ion exchange membrane.

(19) In the redox flow battery electrode according to (17) above, the liquid inflow member of the electrode material may be fitted into a recess portion formed on the surface on a side of the bipolar plate towards the ion exchange membrane.

(20) A redox flow battery electrode according to an embodiment of the present invention is a redox flow battery electrode that is used in a redox flow battery, comprising a conductive sheet containing carbon nanotubes having an average fiber diameter of 1 μm or less; a bipolar plate that is arranged in parallel with the conductive sheet and that comprises a liquid inflow portion such that an electrolyte solution that is passed therethrough flows into the conductive sheet; and a liquid outflow member that is arranged on the side of the conductive sheet opposite to the bipolar plate and out of which flows the electrolyte solution that has passed through the conductive sheet; wherein, when using a sheet surface of the conductive sheet as a reference plane, the Darcy permeability, in an in-plane direction, inside the liquid outflow member, is at least 50 times the Darcy permeability, in a normal direction, through the conductive sheet.

(21) A redox flow battery electrode according to an embodiment of the present invention is a redox flow battery electrode that is used in a redox flow battery, comprising a conductive sheet containing carbon nanotubes having an average fiber diameter of 1 μm or less; a bipolar plate that is arranged in parallel with the conductive sheet and that comprises a liquid inflow portion such that an electrolyte solution that is passed therethrough flows into the conductive sheet; and a liquid outflow member that is arranged on the side of the conductive sheet opposite to the bipolar plate and out of which flows the electrolyte solution that has passed through the conductive sheet; wherein, when using a sheet surface of the conductive sheet as a reference plane, the Darcy permeability, in an in-plane direction, inside the liquid inflow member, is at least 100 times the Darcy permeability, in a normal direction, through the conductive sheet.

(22) A redox flow battery according to an embodiment of the present invention comprises a redox flow battery electrode according to any one of (17) to (21) above.

Advantageous Effects of Invention

By using an electrode material, an electrode of a redox flow battery, and a redox flow battery according to an embodiment of the present invention, it is possible to suppress pressure drops even when using a conductive sheet having poor electrolyte solution passage properties. Additionally, the properties of the electrode material, the electrode of a redox flow battery, and the redox flow battery can be improved.

DESCRIPTION OF EMBODIMENTS

Figure 1:
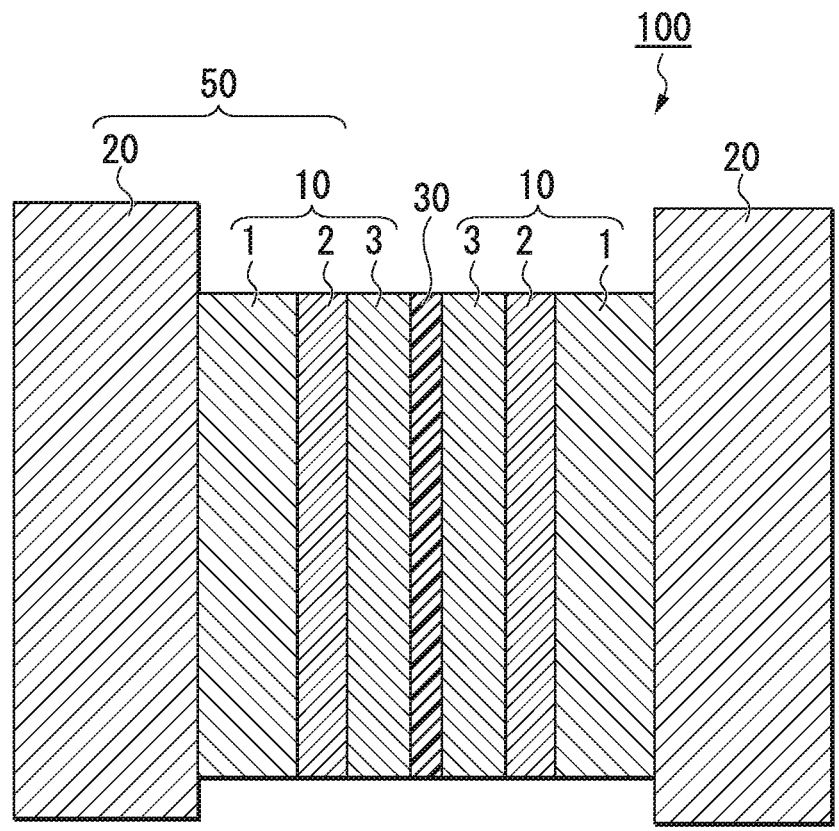
FIG. 1 is a diagram schematically illustrating a cross section of a redox flow battery comprising an electrode material according to a first embodiment of the present invention.

Herebelow, an electrode material, an electrode of a redox flow battery, and a redox flow battery applying the present invention will be explained in detail, with reference to the drawings as appropriate.

In the drawings used in the following description, there are cases in which characterizing portions are shown enlarged for the sake of convenience, in order to make the characteristics of the present invention easier to understand, and the dimensional proportions of the respective constituent elements may differ from the actual dimensional proportions. Additionally, the materials, dimensions and the like indicated in the following description are merely exemplary, and the present invention is not limited thereto and may be carried out by making appropriate modifications within a range not changing the gist thereof.

First Embodiment

FIG. 1 is a diagram schematically illustrating a cross section of a redox flow battery comprising an electrode material according to a first embodiment of the present invention. The redox flow battery 100 comprises bipolar plates 20, an ion exchange membrane 30, and electrode materials 10 provided between the bipolar plates 20 and the ion exchange membrane 30. The electrode materials 10 and the bipolar plates 20 together function as electrodes 50 of the redox flow battery. The electrode material of the present invention can be used in a battery in which an electrolyte flows as a liquid. For example, it can be favorably used in a redox flow battery, a fuel cell, a primary battery, a secondary battery or the like. Herebelow, the invention will be described by using the example of a redox flow battery.

Figure 7:
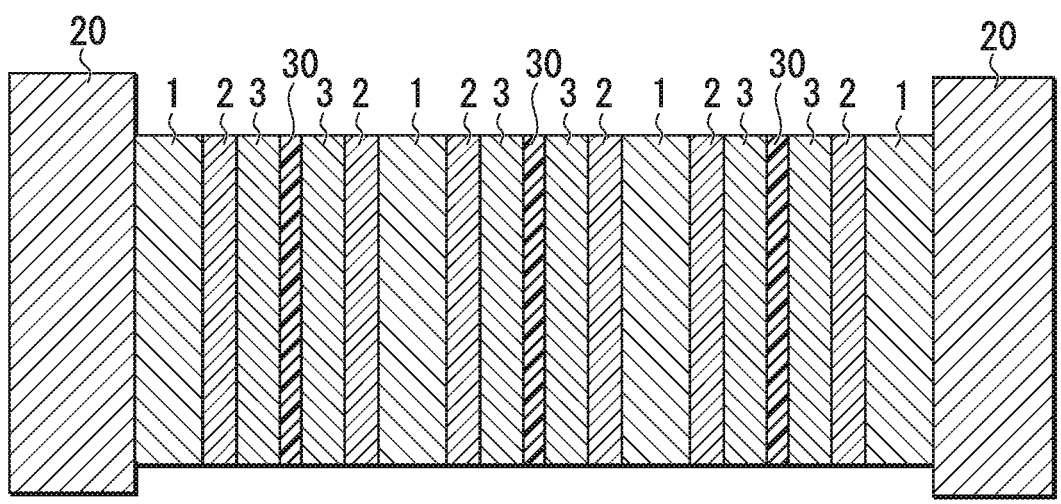
FIG. 7 is a diagram schematically illustrating a cross section of a redox flow battery comprising multiple cells, wherein three unit cells are arranged serially.

In the configuration shown in FIG. 1, the redox flow battery of the present invention is provided with electrode materials 10 according to an embodiment of the present invention, as a positive electrode and a negative electrode, on both sides of the ion exchange member 30. Additionally, FIG. 1 illustrates a unit cell comprising two bipolar plates 20, an ion exchange member 30, and electrode materials 10 provided therebetween, but the redox flow battery may comprise multiple cells of this type arranged serially. FIG. 7 is a diagram schematically illustrating a cross section of a redox flow battery comprising multiple cells, wherein three unit cells are arranged serially.

First, the electrode material 10 will be explained. The electrode material 10 according to an embodiment of the present invention is provided between a bipolar plate 20 and an ion exchange member 30 in a redox flow battery 100. The electrode material 10 comprises a conductive sheet 2 containing carbon nanotubes having an average fiber diameter of 1 μm or less, a liquid inflow member 1 that makes the supplied electrolyte solution flow into the conductive sheet 2, and a liquid outflow member 3 that makes the electrolyte solution that has passed through the conductive sheet 2 flow out.

It is preferable for the liquid inflow member 1 to be formed on the side of the conductive sheet 2 towards the bipolar plate 20, and the liquid outflow member 3 to be formed on the side of the conductive sheet 2 towards the ion exchange membrane. Depending on the mode of use, the liquid inflow member 1 may be formed on the side of the conductive sheet 2 towards the ion exchange membrane and the liquid outflow member 3 may be formed on the side of the conductive sheet 2 towards the bipolar plate 20, as long as the effects of the present invention are achieved. In other words, the arrangement may be such that the positions of the liquid inflow member 1 and the liquid outflow member 3 with respect to the conductive sheet 2 are interchanged.

Additionally, while an embodiment in which the electrolyte solution is introduced through the liquid inflow member 1 and the electrolyte solution is discharged through the liquid outflow member 3 is preferred, an embodiment in which the positions of the liquid inflow member 1 and the liquid outflow member 3 with respect to the conductive sheet 2 are maintained while reversing the flow of liquid is possible as long as the effects of the present invention are achieved. In other words, it is possible to introduce the electrolyte solution through the liquid outflow member 3 and discharge the electrolyte solution through the liquid inflow member 1. Additionally, as mentioned below, a second porous sheet may be provided between the liquid inflow member 1 and the conductive sheet 2.

Additionally, the electrode material of the present invention may be provided with another sheet or element. For example, a sheet having a permeability lower than the liquid inflow member and the liquid outflow member may be provided between the liquid outflow member and the conductive sheet. This sheet having low permeability should preferably be conductive.

Additionally, the conductive sheet 2 in the electrode material may be replaced with a conductive sheet containing only carbon nanotubes having an average fiber diameter larger than 1 μm, or a conductive sheet not containing carbon nanotubes, but containing carbon fibers.

[Electrode Material]
[Conductive Sheet]

The conductive sheet 2 has the property of passing liquids. Additionally, the conductive sheet 2 contains carbon nanotubes having an average fiber diameter of 1 μm or less. The average fiber diameter of the carbon nanotubes is preferably 1 to 300 nm, more preferably 10 to 200 nm, and even more preferably 15 to 150 nm. For this reason, the conductive sheet 2 has very poor liquid passage properties for the electrolyte solution compared with those for carbon fiber felt comprising carbon fibers or the like, which is commonly used. Therefore, the below-mentioned liquid inflow member 1 and liquid outflow member 3 must be set to predetermined conditions.

The average fiber diameter of the carbon nanotubes was determined, for each type of fiber, by measuring the diameters of 100 randomly chosen fibers using a transmission electron microscope, and taking the respective computational average values thereof. The average fiber diameters mentioned below were also determined by the same method. In the present embodiment, the average fiber diameter for each type of fiber among the carbon nanotubes is 1 µm or less in all cases.

As the carbon nanotubes contained in the conductive sheet 2, it is possible to use a configuration in which a plurality of types of carbon nanotubes having different average fiber diameters are mixed. In this case, for example, it is preferable to include first carbon nanotubes having an average fiber diameter of 100 to 1000 nm and second carbon nanotubes having an average fiber diameter of 30 nm or less.

When mixing a plurality of types of carbon nanotubes having different average fiber diameters, the molded conductive sheet 2 is observed through a transmission electron microscope, and in the same field of observation, carbon nanotubes having a fiber diameter exceeding 50 nm are assumed to be the first carbon nanotubes and those having a fiber diameter less than 50 nm are assumed to be second carbon nanotubes, and the average fiber diameters of the respective types are calculated in the manner described above.

Additionally, whether or not there is a mixture of carbon nanotubes of a plurality of types having different average fiber diameters can be determined by observing a molded conductive sheet 2 through a transmission electron microscope, measuring the fiber diameter distribution in the same field of observation, and finding whether there are two or more fiber diameter peaks in said distribution.

The average fiber diameter of the first carbon nanotubes is preferably 100 to 300 nm, more preferably 100 to 200 nm, and even more preferably 100 to 150 nm. The average fiber length is preferably 0.1 to 30 µm, more preferably 0.5 to 25 µm, and even more preferably 0.5 to 20 µm.

The average fiber diameter of the second carbon nanotubes is preferably 1 to 30 nm, more preferably 5 to 25 nm, and even more preferably 5 to 20 nm. The average fiber length is preferably 0.1 to 10 µm, more preferably 0.2 to 8 µm, and even more preferably 0.2 to 5 µm.

The average fiber length can be determined, for each type of fiber, by measuring the diameters of 100 or more randomly chosen fibers using a transmission electron microscope, and taking the respective computational average values thereof.

The second carbon nanotubes should preferably, at least in part, have a structure straddling two or more first carbon nanotubes. A straddling structure may, for example, be confirmed by observation through a transmission electron microscope. If at least a part of a second carbon nanotube is confirmed to have a structure intersecting with two or more first carbon nanotubes, then the carbon nanotube is considered to "have a straddling structure".

Not all of the carbon nanotubes need to be arranged in a "straddling structure". For example, it is sufficient to be able to observe a second carbon nanotube straddling first carbon nanotubes when an electrode is photographed at 100,000-times magnification using a transmission electron microscope. The proportion of second carbon nanotubes having structures straddling two or more first carbon nanotubes is preferably at least 10%, more preferably at least 50%.

This proportion may, for example, be calculated by photographing an electrode at 100,000-times magnification using a transmission electron microscope, and setting the number of second carbon nanotubes that are entirely contained in the photograph as 100%. Second carbon nanotubes for which an end does not appear in the photograph are not used for the calculation.

By having a straddling structure, the conductive sheet 2 will not fall apart during the molding process and the form of the sheet can be stably maintained. Additionally, due to this structure, the spaces between the first carbon nanotubes, which are the main source of conductivity, can be filled by the second carbon nanotubes, thereby raising the conductivity of the electrodes. By raising the conductivity of the electrodes, it is possible to lower the cell resistivity of the redox flow battery, and to increase the electrical capacity.

Additionally, if the average fiber diameters of the first carbon nanotubes and the second carbon nanotubes are in the above-mentioned ranges, then the conductive sheet 2 has a structure capable of maintaining high strength and high conductivity. This is because the first carbon nanotubes form trunks and the second carbon nanotubes are suspended in the form of branches between multiple first carbon nanotubes. For example, if the average diameter of the first carbon nanotubes is at least 100 nm, then the trunks become stable, cracks tend not to occur in the electrode structure, and sufficient strength can be easily maintained. On the other hand, if the average diameter of the second carbon nanotubes is 30 nm or less, then the second carbon nanotubes can be well-entangled with the first carbon nanotubes, thereby improving the conductivity. In other words, by using electrodes having such conductive sheets 2 containing two types of carbon nanotubes with different average fiber diameters, the cell resistivity of the redox flow battery can be lowered and the electrical capacity can be increased.

The second carbon nanotubes preferably, at least in part, have a structure entangled with two or more first carbon nanotubes. The entangled structure can also be confirmed, for example, by observation through a transmission electron microscope. If at least a part of a second carbon nanotube is confirmed to have a structure wrapped by at least one full turn around two or more first carbon nanotubes, then the carbon nanotube is considered to "have an entangled structure".

The entangled structure can also be expected to result in effects similar to the case in which there is a straddling structure.

There are preferably 0.05 to 30 parts by mass of the second carbon nanotubes with respect to a total of 100 parts by mass of the first carbon nanotubes and the second carbon nanotubes. More preferably, there are 0.1 to 20 parts by mass, and even more preferably, there are 1 to 15 parts by mass. If the second carbon nanotubes are contained within these ranges, the electrodes will have a structure allowing high strength and high conductivity to be maintained. This is thought to be due to the fact that, if the second carbon nanotubes are contained within these ranges, the first carbon nanotubes function as the main materials for conducting electricity, and furthermore, the second carbon nanotubes electrically connect the first carbon nanotubes, thereby efficiently supporting the electrical conduction.

The proportion of the second carbon nanotubes with respect to 100 parts by mass in total for the first carbon nanotubes and the second carbon nanotubes can be obtained by observing a molded conductive sheet 2 through a transmission electron microscope, assuming that carbon nanotubes, in the same field of view, having a fiber diameter exceeding 50 nm are first carbon nanotubes and those having a fiber diameter less than 50 nm are second carbon nanotubes, and converting the numbers and sizes to mass on the assumption that the first carbon nanotubes and the second carbon nanotubes have the same density.

Additionally, when the proportions of the first carbon nanotubes and the second carbon nanotubes are in the above-mentioned ranges, they tend to form the aforementioned "straddling structure" and "entangled structure". For this reason, as mentioned above, effects such as reduced cell resistivity and increased electrical capacity can be expected.

The conductive sheet 2 may include conductive materials other than carbon nanotubes. Specific examples include conductive polymers, graphite and conductive carbon fibers. The inclusion of conductive carbon fibers is preferable in view of their acid resistance, oxidation resistance and ease of mixture with carbon nanotubes. The volume resistivity of the carbon fibers is preferably $10^7$ Ω·cm or less, and more preferably $10^3$ Ω·cm or less. The volume resistivity of the carbon fibers can be measured by means of the method described in the Japanese Industrial Standards JIS R 7609: 2007. The combined amount of the carbon nanotubes and other conductive materials contained in the conductive sheet 2 should preferably be 80 mass % or more, since this allows the conductivity of the electrodes to be raised further.

The average fiber diameter of the carbon fibers contained in the conductive sheet 2 should preferably be greater than 1 μm. By using carbon fibers having an average fiber diameter that is thicker than that of the carbon nanotubes, larger spaces can be formed inside the conductive sheet 2, and the pressure drop when passing the electrolyte solution through the electrodes can be reduced. Additionally, effects such as improvement of the conductivity and strength of the sheet can be expected. The structures of the carbon nanotubes and the carbon fibers should preferably be structures in which carbon nanotubes are adhered to the surfaces of the carbon fibers and the carbon nanotubes straddle multiple carbon fibers. This is preferable because it allows the pressure drop to be reduced when passing the electrolyte solution through the electrode and provides good conductivity. The average fiber diameter of the carbon fibers should preferably be 2 to 100 μm, and more preferably 5 to 30 μm. The average fiber length should preferably be 0.01 to 20 mm, more preferably 0.05 to 8 mm, and even more preferably 0.1 to 1 mm.

The amount of carbon fibers contained in the conductive sheet 2 should preferably be 95 parts by mass or less with respect to a total of 100 parts by mass of the carbon nanotubes and the carbon fibers contained in the conductive sheet 2. This is preferable because it allows electrodes for a redox flow battery having a low pressure drop when passing an electrolyte solution through the electrodes to be obtained. The amount of carbon fibers contained in the conductive sheet 2 should preferably be 90 parts by mass or less, and more preferably 85 parts by mass or less with respect to a total of 100 parts by mass of the carbon nanotubes and the carbon fibers contained in the conductive sheet.

The conductive sheet 2 may contain a water-soluble conductive polymer. Water-soluble conductive polymers are preferable because they can hydrophilize the surfaces of the carbon nanotubes, thereby reducing the pressure drop when passing the electrolyte solution through the electrodes. As water-soluble conductive polymers, conductive polymers having sulfo groups are preferable, a specific example of which is polyisothianaphthene sulfonic acid.

The amount of the water-soluble conductive polymer that is added should preferably be 5 parts by mass or less with respect to a total of 100 parts by mass of the carbon nanotubes and the carbon fibers contained in the conductive sheet 2. The amount is more preferably 4 parts by mass or less, and even more preferably 1 part by mass or less. When the conductive sheet 2 is obtained by filtering a dispersion solution containing the carbon nanotubes and the carbon fibers, no more than 5 parts by mass of a water-soluble conductive polymer should normally be contained therein.

The thickness of the conductive sheet 2 prior to being assembled into a battery should preferably be 0.01 to 1 mm, more preferably 0.01 to 0.8 mm, and even more preferably 0.02 to 0.5 mm. These thicknesses are preferred because, at 0.01 or more, good conductivity is obtained, and at 1 mm or less, good liquid passage properties are obtained.

[Liquid Outflow Member]

The liquid outflow member 3 is an element that is provided in order to allow the electrolyte solution that has passed through the conductive sheet 2 to flow to the outside of the electrode material 10. The liquid outflow member 3 is configured to allow the electrolyte solution to flow easily in comparison to the conductive sheet 2. The ease of flow of the electrolyte solution can be evaluated by the permeability according to Darcy's law. While Darcy's law is used to represent the permeability of a porous medium, it will be applied to materials other than porous materials for the sake of convenience in the present invention. When doing so, for materials that are non-homogeneous and anisotropic, the permeability in the direction in which the permeability is the lowest will be employed.

The Darcy permeability (hereinafter sometimes referred to simply as "permeability") through the liquid outflow member 3 is preferably, for example, at least 50 times, and more preferably at least 100 times, the permeability of the conductive sheet 2. In this case, the Darcy permeability k ($m^2$) is calculated, using the cross-sectional area S ($m^2$) of the material through which a liquid having the viscosity μ (Pa·sec) is to be passed, the length L (m) of the material, and the pressure differential ΔP (Pa) between the liquid inflow side and the liquid outflow side of the material when passing the liquid at a flow rate Q ($m^3$/sec), based on the below-given expression for the liquid transmission flux (m/sec). When the liquid inflow member and the liquid outflow member consist of space, the cross-sectional area perpendicular to the direction of passage of the liquid through the space formed in the liquid inflow member when assembled in the electrode material 10 is defined as the "cross-sectional area S of the material through which liquid is being passed".

[Expression 1]

$$\frac{Q}{S} = \frac{k}{\mu} \times \frac{\Delta P}{L} \tag{1}$$

The permeability within the liquid outflow member 3 refers to the permeability in the in-plane direction (direction parallel to the sheet surface) when using the sheet surface of the conductive sheet 2 as the reference plane, and the permeability of the conductive sheet 2 is the permeability in the normal direction (direction orthogonal to the sheet surface) when using the sheet surface of the conductive sheet 2 as the reference plane.

When the permeability within the liquid outflow member 3 is sufficiently higher than the permeability of the conductive sheet 2, the electrolyte solution that has passed through the conductive sheet 2 is quickly discharged to the outside of the electrode material 10 without accumulating on the outflow side. The fact that the electrolyte solution does not accumulate in the liquid outflow member 3 means that the pressure necessary to pass the electrolyte solution through the liquid outflow member 3 is much lower than the pressure necessary to pass the electrolyte solution through the conductive sheet 2. In other words, if the permeabilities of the conductive sheet 2 and the liquid outflow member 3 have the above-indicated relationship, then when the flow of the electrolyte solution passing through the conductive sheet 2 is in a direction perpendicular to the surface of the conductive sheet 2, the electrolyte solution can be made to pass through the inside of the liquid outflow member 3 and be discharged to the outside of the electrode material 10 without disrupting the flow, in the perpendicular direction, inside the conductive sheet 2.

Additionally, by increasing the thickness after assembly of the liquid outflow member 3, the pressure necessary for passing the electrolyte solution through the liquid outflow member 3 can be further reduced. The thickness of the liquid outflow member 3 after assembly is preferably at least 0.08 mm, more preferably 0.1 to 0.7 mm, and even more preferably 0.15 to 0.5 mm. The thickness is preferably at least 0.08 mm because this allows the pressure necessary for passing the electrolyte solution to be reduced. Additionally, the thickness is preferably 0.7 mm or less because this limits increases in the cell resistivity.

After passing through the conductive sheet 2, a high proportion of the electrolyte solution consists of electrolyte solution in which an oxidation reaction or a reduction reaction has occurred. By causing the electrolyte solution to quickly flow out in this way, ions that have undergone valence changes can be efficiently removed from the vicinity of the conductive sheet 2, thereby raising the reactivity.

For example, when using an electrolyte solution containing vanadium, during the charging process, $V^{4+}$ is converted to $V^{5+}$ at the positive electrode and $V^{3+}$ is converted to $V^{2+}$ at the negative electrode. For this reason, due to the efficient removal of post-reaction ions ($V^{5+}$ and $V^{2+}$), pre-reaction ions ($V^{4+}$ and $V^{3+}$) can be quickly supplied to the conductive sheet, so the ions that have and have not undergone a reaction can be efficiently interchanged, thereby increasing the reaction efficiency. During the discharging process, the ion valence changes are reversed, but as with the charging process, the ions that have and have not undergone a reaction can be efficiently interchanged, thereby increasing the reaction efficiency.

Figure 2:
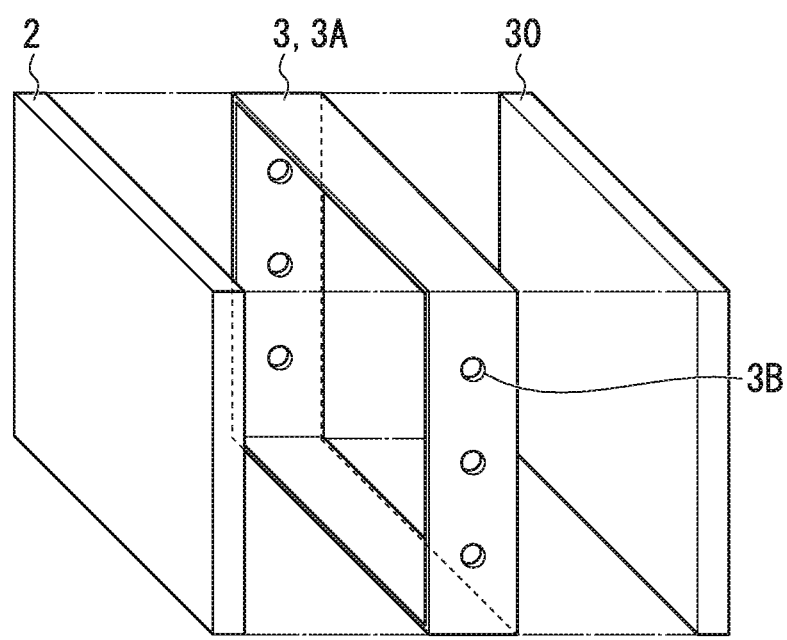
FIG. 2 is a perspective schematic view of a case in which a liquid outflow member comprises an outer frame.

The specific form of the liquid outflow member 3 is not particularly limited as long as the permeability of the liquid outflow member 3 and the permeability of the conductive sheet 2 have the above-mentioned relationship. For example, as illustrated in FIG. 2, the liquid outflow member 3 may be an outer frame 3A that is disposed between the conductive sheet 2 and the ion exchange membrane 30, and provided with liquid outflow ports 3B that discharge the electrolyte solution to the outside of the electrode material 10. In FIG. 2, the elements are illustrated separately in order to aid in understanding, but in the form in which they are actually used, the elements are in contact with each other. When the liquid outflow member 3 comprises such an outer frame, the electrolyte solution flows in a space enclosed by the conductive sheet 2, the ion exchange membrane 30 and the outer frame. In this case, the "permeability within the liquid outflow member 3" does not refer to the permeability of the materials constituting the outer frame themselves, but rather the permeability, in the in-plane direction, of the portion constituted by the space formed by the outer frame and the liquid outflow ports 3B formed in the outer frame. The outer frame does not refer to the frame that is formed outermost. Additionally, there may be an enclosure (such as a casing) formed by separate elements on the outside of the outer frame.

The liquid outflow member 3 preferably comprises a porous sheet (first porous sheet). In this case, the liquid outflow ports 3B illustrated in FIG. 2 correspond to multiple holes that are present on the side surfaces of the first porous sheet. Since the liquid outflow member 3 comprises a first porous sheet, the liquid outflow member 3 functions as a buffer member between the conductive sheet 2 and the ion exchange membrane 30. Due thereto, it is possible to suppress the occurrence of damage or the like to the ion exchange membrane 30 and to stably support the conductive sheet 2. In this case, the "permeability within the liquid outflow member 3" refers to the permeability, in the in-plane direction, of the first porous sheet overall.

The first porous sheet may be a spongy material having voids or may be an element formed by entanglement of fibers. For example, it is possible to use a fabric that is woven from relatively long fibers, felt formed by entangling fibers without weaving them, paper that is formed into a sheet by laying relatively short fibers, or the like. When the first porous sheet comprises fibers, it preferably comprises fibers having an average fiber diameter larger than 1 μm. If the average fiber diameter of the first porous sheet is 1 μm or more, sufficient liquid passage properties can be ensured for the electrolyte solution inside the first porous sheet.

The first porous sheet preferably should not be corroded by the electrolyte solution. Specifically, in redox flow batteries, an acidic solution is often used. For this reason, it is preferable for the first porous sheet to be acid-resistant. Since oxidation due to a reaction is also possible, it is preferable for the first porous sheet to be oxidation-resistant. Being acid-resistant or oxidation-resistant refers to the property in which the porous sheet retains its shape after use.

For example, fibers consisting of an acid-resistant polymer or glass are preferable. As the polymer, fibers comprising at least one polymer chosen from among fluororesins and fluoroelastomers, polyesters, acrylic resins, polyethylenes, polypropylenes, polyarylates, polyether ether ketones, polyimides and polyphenylene sulfides are preferably used. For the purposes of acid-resistance, fluororesins, fluoroelastomers, polyesters, acrylic resins, polyethylenes, polypropylenes, polyether ether ketones, polyimides and polyphenylene sulfides are more preferable. For the purposes of oxidation-resistance, fluororesins, fluoroelastomers, polyethylenes, polyether ether ketones and polyphenylene sulfides are more preferable. For the purposes of heat resistance, fluororesins, fluoroelastomers, polyesters, polypropylenes, polyarylates, polyether ether ketones, polyimides and polyphenylene sulfides are more preferable.

Additionally, this first porous sheet preferably has conductivity. In this case, conductivity refers to conductivity of a level such that the volume resistivity is preferably $10^7$ Ω·cm or less, and more preferably $10^3$ Ω·cm or less. If the first porous sheet has conductivity, then the electrical conductivity inside the liquid outflow member 3 can be raised. For example, when a first porous sheet is to be formed using fibers comprising a material having conductivity, it is possible to use fibers comprising acid-resistant and oxidation-resistant metals or alloys, or carbon fibers. Examples of metal or alloy fibers include those containing titanium, zirconium and platinum. Among these fibers, it is preferable to use carbon fibers.

[Liquid Inflow Member]

The liquid inflow member 1 is an element that is provided in order to allow the electrolyte solution that has passed through the liquid inflow member 1 to flow into the conductive sheet 2. The liquid inflow member 1 also has the role of transmitting, to the bipolar plate 20, changes in the electric charge arising in the conductive sheet 2 during the charging and discharging processes, and thus preferably has conductivity.

The liquid inflow member 1 preferably has a structure that allows the electrolyte solution to flow more easily in comparison with the conductive sheet 2. For this reason, when the ease of flow of the electrolyte solution is evaluated by the permeability as in the case of the above-mentioned liquid outflow member 3, the permeability within the liquid inflow member 1 is preferably at least 100 times, more preferably at least 300 times, and even more preferably at least 1000 times the permeability of the conductive sheet 2. The permeability is calculated using the same method as that used for the liquid outflow member 3. The permeability within the liquid inflow member 1 refers to the permeability in the in-plane direction (direction parallel to the sheet surface) when using the sheet surface of the conductive sheet 2 as the reference plane, and the permeability of the conductive sheet 2 is the permeability in the normal direction (direction orthogonal to the sheet surface) when using the sheet surface of the conductive sheet 2 as the reference plane.

When the permeability within the liquid inflow member 1 is sufficiently higher than the permeability of the conductive sheet 2, it is difficult for the liquid that has flowed into the liquid inflow member 1 to flow into the conductive sheet 2, which has lower permeability, and thus, the liquid spreads over the entirety of the liquid inflow member 1, and the pressure distribution inside the liquid inflow member 1, in the in-plane direction, is limited and made uniform within the liquid inflow member 1. Therefore, the flow of the electrolyte solution that passes through the conductive sheet 2 and flows to the liquid outflow member naturally becomes flow that is uniform within the plane of the sheet surface, in a direction that is more perpendicular to the plane of the conductive sheet 2. Additionally, the distance that is traveled by the electrolyte solution through the conductive sheet 2, which is the part of the electrode material 10, composed of the liquid inflow member, the conductive sheet and the liquid outflow member, through which the electrolyte solution has the most difficulty flowing, can be minimized to be the same distance as the thickness of the conductive sheet 2, so the pressure drop can be reduced. Furthermore, the flow of the electrolyte solution passing through the conductive sheet 2 can be made uniform within the plane of the sheet surface, thereby allowing reactive species to be collectively and efficiently substituted during the charging and discharging processes, reducing the cell resistance, and improving the electrical charging/discharging capacity.

The specific form of the liquid inflow member 1 is not particularly limited as long as the permeability of the liquid inflow member and the permeability of the conductive sheet 2 have the above-mentioned relationship. Additionally, the liquid inflow member 1 is preferably conductive in order to allow electricity to pass between the bipolar plate 20 and the conductive sheet 2.

The liquid inflow member 1 may be an outer frame that is disposed between the conductive sheet 2 and the bipolar plate 20, and provided with a liquid inflow port. When the liquid inflow member 1 comprises such an outer frame, the electrolyte solution flows in a space enclosed by the conductive sheet 2, the bipolar plate 20 and the outer frame. In this case, the "permeability within the liquid inflow member 1" does not refer to the permeability of the materials constituting the outer frame themselves, but rather the permeability, in the in-plane direction, of the space formed by the outer frame. The outer frame does not refer to the frame that is formed outermost. Additionally, there may be an enclosure (such as a casing) formed by separate elements on the outside of the outer frame.

Figure 3:
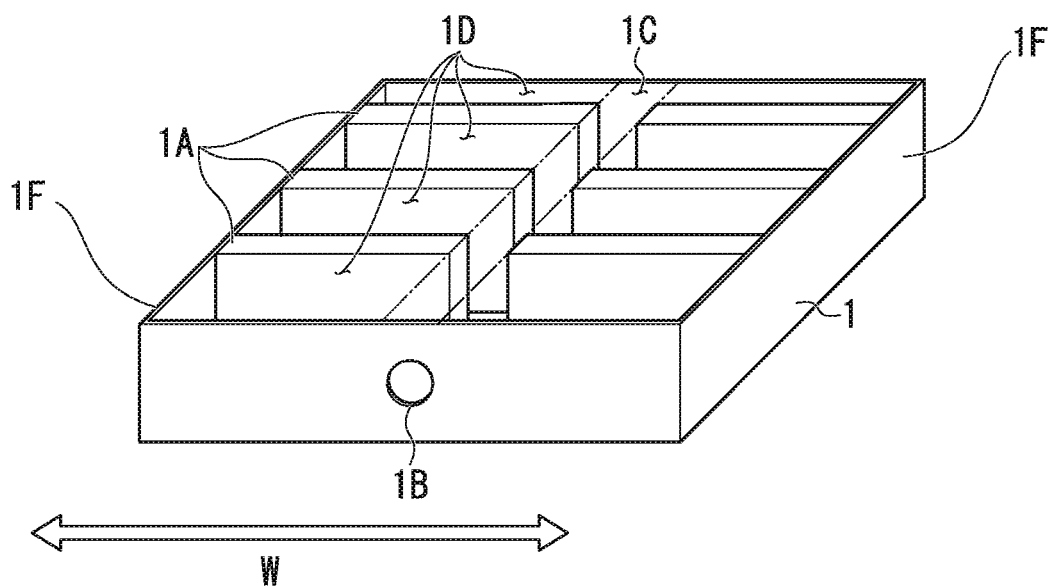
FIG. 3 is a perspective view schematically illustrating an embodiment of a liquid inflow member.

FIG. 3 is a perspective view schematically illustrating an embodiment of the liquid inflow member 1. As illustrated in FIG. 3, the liquid inflow member 1 preferably comprises support members 1A supporting the conductive sheet 2. By supporting the conductive sheet 2 with the support members 1A, it is possible to prevent the conductive sheet 2 from vibrating or being damaged by the flow of the electrolyte solution. Additionally, the support members 1A adhere to the conductive sheet 2 so that good conduction is obtained.

The area of contact of the support members 1A with the conductive sheet 2 is preferably 10% to 80%, more preferably 30% to 60%, of the area of the inflow member. This is because, as long as the area is 10% or more, conduction can be ensured, and as long as the area is 80% or less, the liquid flows well from the inflow member to the conductive sheet.

The height of the support members 1A does not need to be the same as the thickness of the liquid inflow member 1. For example, support members 1A having a height that is lower than the thickness of the liquid inflow member 1 may be provided.

The support members 1A are preferably arranged as in FIG. 3. Specifically, the support members 1A should preferably be arranged so as to form a first flow passage 1C through which the electrolyte solution flows from a liquid inflow port 1B, formed at a central portion on one end of the liquid inflow member 1 in the direction of flow of the electrolyte solution, to a central portion on the other end, and second flow passages 1D, connected to the first flow passage 1C, through which the electrolyte solution flows from the first flow passage 1C, in a direction intersecting therewith, to the side surfaces 1F, 1F of the liquid inflow member 1. Additionally, it is more preferable for the second flow passages 1D to be formed in a direction perpendicular to the first flow passage 1C. It is preferable for the liquid inflow port 1B to be formed at a central portion on one end of the liquid inflow member 1 in the direction of flow of the electrolyte solution, as in the structure illustrated in FIG. 3. However, this does not preclude a structure in which the liquid inflow port 1B is formed, not at a central portion, but offset towards one side surface.

By arranging the support members 1A in this manner, the flow of the electrolyte solution that has flowed into the liquid inflow member 1 can be controlled so as to spread from the first flow passage 1C to the second flow passages 1D. Due to this structure, the length of the second flow passages 1D can be shortened. As a result thereof, when the electrolyte solution spreads inside the liquid inflow member 1, the distance over which the electrolyte solution flows is made shorter (it may be half the width w of the liquid inflow member 1 or less). In other words, it becomes easier for the electrolyte solution to spread over the entirety of the liquid inflow member 1. Therefore, the direction of flow of the electrolyte solution passing through to the conductive sheet 2 can be made perpendicular to the conductive sheet 2. In the case of a structure, unlike the structure illustrated in FIG. 3, wherein the first flow passage is formed along one side surface 1F and the second flow passages extend from the first flow passage towards the other side surface 1F, the distance over which the electrolyte solution flows becomes approximately the width w of the liquid inflow member 1.

[Flow of Electrolyte Solution in Electrode Material]

Figure 4:
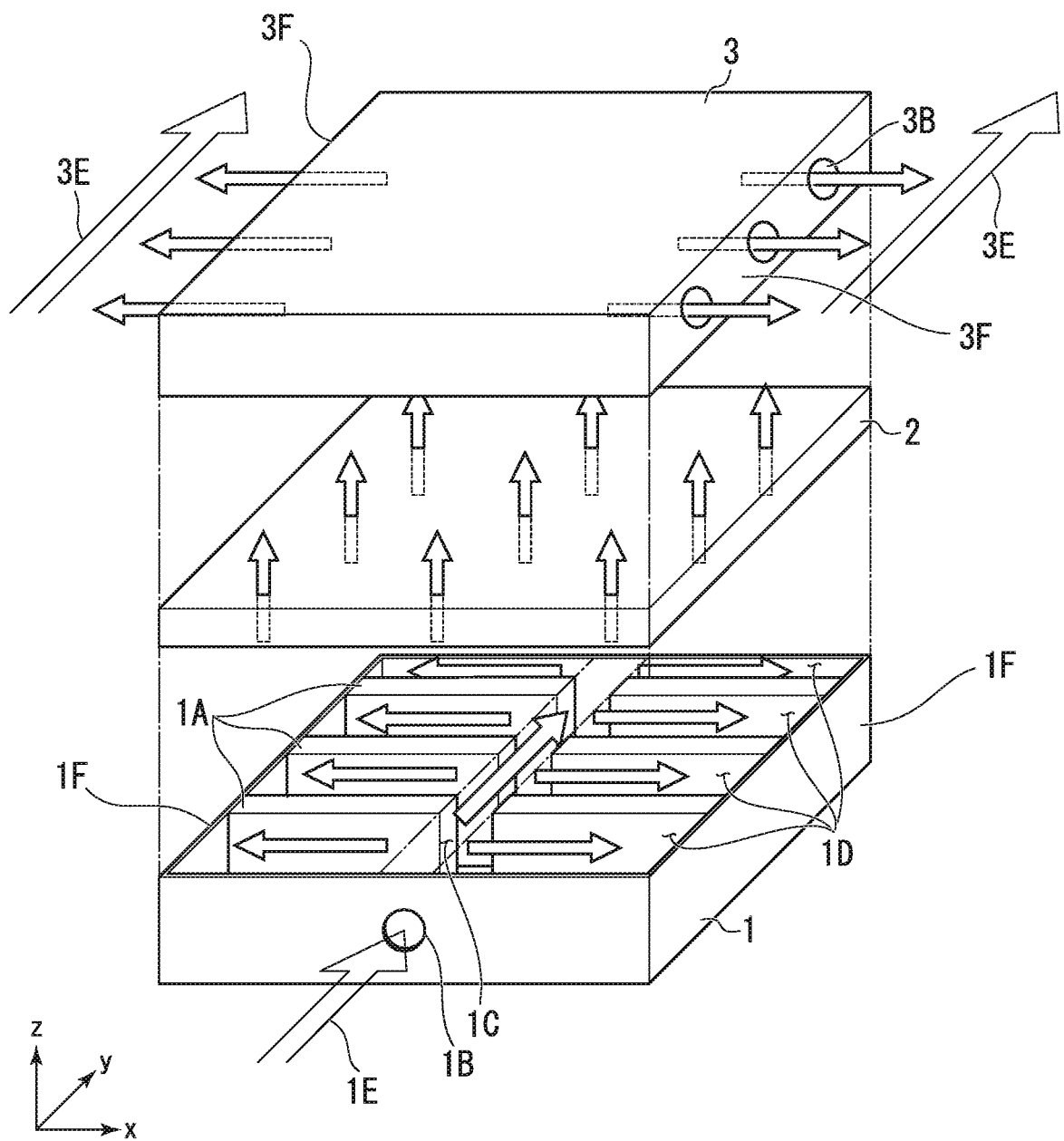
FIG. 4 is a perspective view schematically illustrating the flow of an electrolyte solution inside an electrode material according to an embodiment of the present invention.

By having the above-mentioned structure, the electrode material 10 is able to control the flow of the electrolyte solution. FIG. 4 schematically illustrates an example of the flow of the electrolyte solution within the electrode material 10 according to one embodiment of the present invention. In FIG. 4, the flow of the electrolyte solution will be explained on the assumption that, in the liquid inflow member 1, the first flow passage 1C and the second flow passages 1D are formed by the support members 1A. In FIG. 4, the left-right direction in the drawing is the x direction, the direction from the front of the illustrated paper surface towards the rear is the y direction, and the up-down direction in the drawing is the z direction.

Although not illustrated, an insulating member (frame) that supports the electrode material 10 is normally provided around the electrode material 10. The frame structurally supports the electrode material 10 and also has a liquid feeding passage that feeds the electrolyte solution to the electrode material 10 and a liquid discharge passage that discharges the electrolyte solution flowing out of the electrode material 10. In the drawing, the flow of the electrolyte solution that flows from the liquid feeding passage into the liquid inflow member 1 is illustrated as the feeding direction 1E and the flow of the electrolyte solution that flows out from the liquid outflow member 3 to the liquid discharge passage is illustrated as the discharge direction 3E.

The electrolyte solution that is supplied from the liquid inflow passage along the feeding direction 1E to the electrode material 10 flows in through the liquid inflow port 1B of the liquid inflow member 1, then flows along the first flow passage 1C and branches into the second flow passages 1D. In this structure, the distance (distance in the x direction) over which the electrolyte solution flows along the second flow passage 1D is no more than half of one side (width w) of the liquid inflow member 1. The longer the distance that is needed for the electrolyte solution to flow to a prescribed position in the liquid inflow member 1, the more difficult it becomes to spread the electrolyte solution over the entirety of the liquid inflow member 1 before the electrolyte solution flows from the liquid inflow member 1 into the conductive sheet 2 (or while the amount of the electrolyte solution flowing to the conductive sheet 2 is small). Therefore, the distance (or time) required until the electrolyte solution spreads throughout the liquid inflow member 1 can be shortened by causing the electrolyte solution to flow between both side surfaces 1F, 1F (preferably at the center thereof) of the liquid inflow member 1, so that the electrolyte solution spreads towards the side surfaces 1F, 1F. In other words, the electrolyte solution can be uniformly and efficiently spread throughout the entirety of the liquid inflow member 1.

Next, the electrolyte solution that has flowed throughout the entirety of the liquid inflow member 1 flows to the conductive sheet 2. As mentioned above, the electrolyte solution quickly spreads, inside the liquid inflow member, throughout the entirety of the liquid inflow member 1. Thereafter, the electrolyte solution flows roughly towards the illustrated z direction inside the conductive sheet 2. In other words, the electrolyte solution passes in a direction perpendicular to the surface of the conductive sheet 2.

The electrolyte solution that has passed through the conductive sheet 2 flows into the liquid outflow member 3. The electrolyte solution that has flowed out of the liquid outflow ports 3B flows out, from the liquid discharge passage of the frame, in the discharge direction 3E. In FIG. 4, the liquid outflow ports 3B are only formed at side surfaces 3F, 3F that are parallel to the discharge direction 3E of the liquid outflow member 3, but the structure is not limited thereto, and it is possible to have structures in which they are formed in other side surfaces, or structures in which they are formed in all the side surfaces, and there is no particular limitation. It is also possible to have many liquid outflow ports covering the side surfaces in their entirety. A sealing material or the like may be used to provide a structure in which the electrolyte solution entering through the liquid inflow port does not mix with the electrolyte solution exiting from the liquid outflow ports. In the example in FIG. 4, liquid discharge passages are provided on both side surfaces of the electrode material 10, so the discharge direction 3E could actually be illustrated as an arrow along the y-axis direction on the side surfaces of the liquid inflow member 1 and the conductive sheet 2 as well. In FIG. 4, it is only shown at the side surfaces (the surfaces parallel to the y direction) of the liquid outflow member 3 for the purpose of avoiding confusion due to a complicated drawing.

While the flow of positive electrode electrolyte solution or negative electrode electrolyte solution within the electrode material has been explained above by referring to FIG. 4, the flow until the electrolyte solution is supplied into the electrode material and the flow after the electrolyte solution is discharged from the electrode material will be briefly explained below.

A redox flow battery comprises a cell that is separated, by an ion exchange membrane that transmits hydrogen ions, into a positive electrode chamber and a negative electrode chamber. The positive electrode chamber (negative electrode chamber) contains a positive electrode (negative electrode) and a tank that stores a positive electrode electrolyte solution (negative electrode electrolyte solution) is connected thereto by a conduit. The electrolyte solution stored in the tank for storing the positive electrode electrolyte solution (negative electrode electrolyte solution) is circulated in the positive electrode chamber (negative electrode chamber) by means of a pump when charging and discharging electricity. After the electrolyte solution stored in the tank is supplied to the positive electrode chamber (negative electrode chamber) by the pump and flows through the liquid feeding passage inside the positive electrode chamber (negative electrode chamber), it flows sequentially through the liquid inflow member 1, the conductive sheet 2 and the liquid outflow member 3, as explained above with reference to FIG. 4, and returns from the liquid outflow member 3 to the tank through a liquid discharge passage in the positive electrode chamber (negative electrode chamber).

By controlling the permeability and the thickness of the liquid outflow member 3 as mentioned above, the electrolyte solution that has flowed into the liquid outflow member 3 can quickly flow out. By making the outflow of the electrolyte solution from the liquid outflow member 3 quicker in this way, the amount of electrolyte solution inside the liquid outflow member 3 is reduced, so electrolyte solution can more easily flow from the conductive sheet 2 into the liquid outflow member 3, and it becomes easier to continue the flow of the electrolyte solution in the direction perpendicular to the surface of the conductive sheet 2.

Figure 5A:
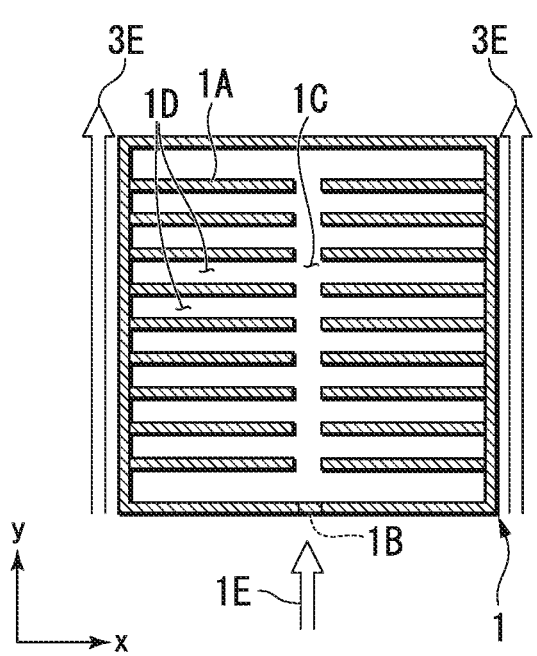
FIGS. 5A to 5D are plan views schematically illustrating an embodiment of a liquid inflow member provided with support members.

FIGS. 5A to 5D are schematic plan views of the liquid inflow member 1. While the discharge direction 3E is illustrated around the liquid inflow member 1, this is because it is assumed that liquid discharge passages are formed on the entirety of both side surfaces, in the x direction, in FIG. 4. FIG. 5A is a schematic plan view of FIG. 3. The direction of arrangement of the support members 1A is the direction orthogonal to the discharge direction 3E. The material forming the support members 1A is not particularly limited as long as the material is resistant to the electrolyte solution.

Figure 5B:
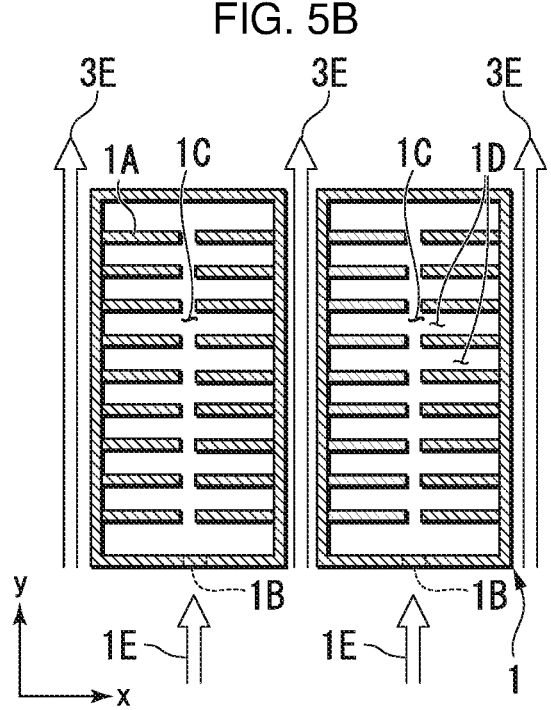

When the total area of the electrode material is to be made large, it is possible to multiply arrange two or more liquid inflow members 1 inside the electrode material as a whole, as illustrated in FIG. 5B. When arranging multiple liquid inflow portions 1 in parallel, it is preferable to provide liquid discharge passages for discharging the liquid that has flowed out from the liquid outflow member 3 on both side surfaces of the liquid inflow member 1. In this case, the liquid discharge passage provided between the two liquid inflow members 1 does not need to be formed by a frame, and may be a gap provided between the adjacent liquid inflow members 1. When multiple liquid inflow portions 1 are arranged in parallel as illustrated in FIG. 5B, it is preferable to align the multiple liquid inflow portions so that the direction of the first flow passage 1C in each liquid inflow portion 1 is the same as the direction of the electrolyte solution flowing into the liquid inflow member 1. By using such a structure, it is possible to shorten the distance (lengths of the second flow passages 1D) over which the electrolyte solution flowing into the liquid inflow port 1B must flow inside the liquid inflow member 1 in flowing towards the final discharge direction 3E. As a result thereof, it is possible to make the distance over which the electrolyte solution flows when the electrolyte solution spreads inside the liquid inflow portions 1 even shorter. In other words, the electrolyte solution can be made to more easily spread throughout the entirety of the liquid inflow member 1. Additionally, inside the corresponding liquid outflow portion 3 also, it is possible to shorten the distance until the electrolyte solution that has flowed in by passing through the conductive sheet 2 in the perpendicular direction arrives at the liquid discharge passages, thereby reducing the pressure gradient inside the liquid outflow portions 3, and making the flow of the electrolyte solution passing through the conductive sheet 2 in the perpendicular direction more uniform.

Figure 5C:
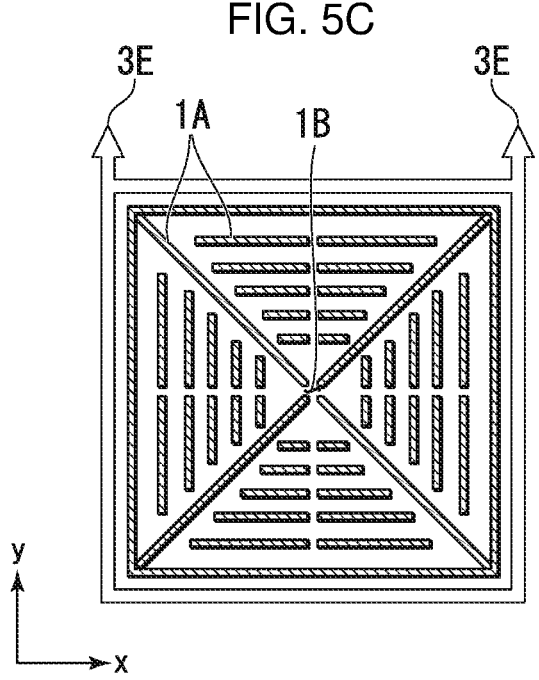

The liquid inflow port 1B may also be provided at a portion other than one end of the liquid inflow member 1. For example, as illustrated in FIG. 5C, a liquid inflow port 1B may be provided at the center of the liquid inflow member 1. In this case, the liquid feeding passage (not shown) connected to the liquid inflow port 1B is not formed by a frame, but is provided in the bipolar plate 20. In other words, the feeding direction 1E is from the rear side of the paper surface to the front side of the paper surface. Additionally, the corresponding liquid discharge passage is provided so as to surround the outer periphery of the liquid inflow member 1. With such a structure, the support members 1A are preferably arranged so as to spread from the center towards the outer periphery of the liquid inflow member 1, for example, as shown in FIG. 5C. Due to this arrangement, the distance over which the electrolyte solution that has flowed in through the liquid inflow port 1B must travel in order to spread throughout the entire liquid inflow member 1 is shortened, and the electrolytic solution can be efficiently spread throughout the entirety of the liquid inflow member 1. In the corresponding liquid outflow portion 3 as well, it is possible to shorten the distance over which the electrolyte solution that has flowed in by passing through the conductive sheet 2 in the perpendicular direction must travel until arriving at the liquid discharge passage, thereby reducing the pressure gradient inside the liquid outflow portion 3 and making the flow of the electrolyte solution passing through the conductive sheet 2 in the perpendicular direction more uniform.

A porous sheet (second porous sheet) may further be provided between the liquid inflow member 1 and the conductive sheet 2. The second porous sheet may be laminated onto either the liquid inflow member 1 or the conductive sheet 2. In other words, they may be treated respectively as an element formed by laminating the liquid inflow member 1 with a second porous sheet, and an element formed by laminating the conductive sheet 2 with a second porous sheet.

By providing a second porous sheet, it is possible to control the in-plane variation in the amount of electrolyte solution flowing into the conductive sheet 2. In particular, when support members 1A are provided, the effect of better suppressing the in-plane variation in the amount of electrolyte solution flowing into the conductive sheet 2 becomes even more pronounced. This is because there can be considered to be an in-plane variation in the amount of the electrolyte solution flowing into the conductive sheet 2 between the portions at which the support members 1A are provided and the portions at which the flow passages are formed. The second porous sheet may be composed of the same material as the first porous sheet, and may have the same permeability as the first porous sheet. Additionally, the former and the latter may each further have the same thickness as the first porous sheet.

Specifically, the second porous sheet, like the first porous sheet, may be a spongy element having voids or may be an element formed by entanglement of fibers. For example, it is possible to use a fabric that is woven from relatively long fibers, felt formed by entangling fibers without weaving them, paper that is formed into a sheet by laying relatively short fibers, or the like. When the second porous sheet comprises fibers, it preferably comprises fibers having an average fiber diameter larger than 1 µm. If the average fiber diameter of the second porous sheet is 1 µm or more, sufficient liquid passage properties can be ensured for the electrolyte solution inside the second porous sheet.

Figure 5D:
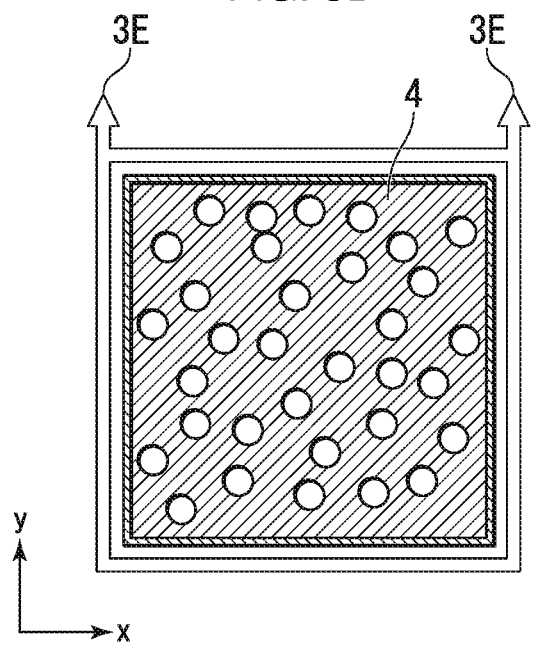

A porous sheet (third porous sheet) 4 may be provided inside the liquid inflow member 1, as shown in FIG. 5D. In FIG. 5D, the pores in the third porous sheet 4 are schematically illustrated by using multiple circles, but the structure is not limited thereto. For example, even in the case of a spongy element having voids, the element may be formed by entanglement of fibers. More specifically, in the third porous sheet, it is possible to use the same material as the first porous sheet. Since the electrolyte solution can be supplied throughout the entire interior of the liquid inflow member 1 through the third porous sheet, it is possible to use the third porous sheet 4 without providing support members 1A. In this case, the liquid feeding passage and the liquid discharge passage are arranged in the same manner as in FIG. 5A and FIG. 5C, and therefore, the feeding direction 1E and the discharge direction 3E will also be the same.

The third porous sheet may be of the same material as the first porous sheet or the second porous sheet, and may have the same permeability as the first porous sheet or the second porous sheet. Additionally, the former and the latter may each further have the same thickness as the first porous sheet or the second porous sheet.

Particularly when a porous sheet or the like is used in the liquid inflow member 1 and the liquid outflow member 3, the thickness during the preparation stage before assembly into an electrode material differs from the thickness after assembly. This is because the elements are packaged by compressing them into confined areas. In the present specification, "average thickness" refers to the thickness after assembly of a porous sheet into an electrode material. The thickness after assembly can be calculated from the elasticity of each element and the thickness of each element prior to assembly. Therefore, the average thickness is obtained by measuring the thickness of each element before assembly into the electrode material 10, determining the average value thereof, and calculating the thickness after assembly from the average value of the elasticity or the like. The number of measurement points of the thickness of each element may, for example, be set to about 10, and the precision can be raised by increasing the number of measurement points. Additionally, when the insides of the liquid inflow member 1 and the liquid outflow member 3 are composed of spaces, the elasticities of these inside spaces are zero. In this case, the thickness of each element can be determined by calculating how much an adjacent element intrudes into the space when the element is deformed by bending or the like. Alternatively, the thickness can be actually measured by cutting an electrode material after being packaged, and measuring the cross section thereof.

[Bipolar Plate and Ion Exchange Membrane]

The bipolar plate 20, together with the electrode material 10, forms the electrode 50 of the redox flow battery.

The bipolar plate 20 may be of a type that is generally known. For example, a conductive material containing carbon may be used. Specific examples include a conductive plastic comprising graphite and a chlorinated organic compound, a conductive plastic in which graphite has been partially replaced with at least one of carbon black and diamond-like carbon, and molded materials formed by knead-molding carbon and plastic. Of these, it is preferable to use a molded material formed by knead-molding carbon and plastic.

Additionally, a recess portion may be formed in the bipolar plate 20. The liquid inflow member 1 of the electrode material 10 may be fitted into this recess portion. Additionally, a portion of the bipolar plate 20 may be formed as a liquid inflow member 1 of the electrode material 10, and the liquid inflow portion 1 may be integrated into the bipolar plate 20. Due to these structures, it is possible to make the thickness of a unit cell of the redox flow battery thinner.

The ion exchange membrane 30 may be a generally known cation exchange membrane. Specific examples include perfluorocarbon polymers having sulfonic acid groups, hydrocarbon-based macromolecular compounds having sulfonic acid groups, macromolecular compounds doped with inorganic acids such as phosphoric acid, organic/inorganic hybrid polymers that are partially substituted with proton-conductive functional groups, and proton conductors formed by impregnating a macromolecular matrix with a phosphoric acid solution or a sulfuric acid solution. Among these, perfluorocarbon polymers having sulfonic acid groups are preferred, and Nafion (registered trademark) is more preferred.

[Redox Flow Battery Production Method]

The conductive sheet 2 can be molded into sheet form by preparing a dispersion solution containing carbon nanotubes beforehand, then removing the dispersion medium by filtration, or coating, spin-casting or spraying the dispersion solution and thereafter evaporating away the dispersion medium.

The method for preparing the dispersion solution containing the carbon nanotubes is not particularly limited. For example, a ball mill, a paint shaker, an ultrasonic homogenizer or a jet mill may be used. A wet-type jet mill is preferred for being able to uniformly disperse the carbon nanotubes while suppressing damage to the carbon nanotubes. Dispersion by a wet jet mill may be preceded by preliminary mixing by using a wet disperser or the like.

If multiple types of carbon nanotubes having different average fiber diameters are to be contained, then the multiple types of carbon nanotubes having different average fiber diameters may be added to the dispersion medium, and the dispersion solution may be prepared and molded in the aforementioned manner.

A conductive sheet containing carbon fibers or conductive polymers may be produced by obtaining a dispersion solution by further mixing and dispersing carbon fibers or conductive polymers in a dispersion solution containing carbon nanotubes, then molding by means of the aforementioned method. When dispersing the carbon fibers, it is preferable to use an ultrasonic treatment due to the convenience thereof.

When preparing the dispersion solution containing carbon nanotubes, the carbon nanotubes can be more easily mixed evenly by adding a dispersant. The dispersant may be one that is generally known such as, for example, a water-soluble conductive polymer.

The liquid outflow member 3 and the liquid inflow member 1 may be produced by machining arbitrary elements so as to fit the conductive sheet 2, if the liquid outflow member 3 and the liquid inflow member 1 are to be formed from outer frames. Additionally, when one or both of the liquid outflow member 3 and the liquid inflow member 1 is to be a first porous sheet, it can be obtained by machining a commercially available porous sheet to a predetermined size.

Additionally, when providing support members 1A in the liquid inflow member 1, they may be machined so as to leave the support members 1A at the time of machining, or may be formed by injection molding or compression molding. It is also possible to appropriately install separate commercially available elements.

The liquid inflow member 1, conductive sheet 2 and liquid outflow member 3 that have been separately produced in this way are laminated to form an electrode material 10. Additionally, when the liquid inflow member 1 and/or the liquid outflow member 3 comprise porous sheets, they may be formed, for example, by arranging filter paper on a filtering machine, arranging a porous sheet thereon, pouring a dispersion solution containing carbon nanotubes onto the porous sheet, and performing suction filtration.

A laminate obtained in this manner is integrated by press-forming. Press-forming may be performed while heating.

The press pressure and the heating temperature may be determined by preliminary testing. For example, the laminate may be produced by applying pressure at a press pressure of 20 MPa, and heating at a temperature of 50 to 250° C. If the dispersion medium is water, then it should be heated to approximately 80° C. in order to remove the dispersion medium.

An electrode produced in this way may be assembled into a redox flow battery by a conventional method. The battery operation method may be in accordance with normal redox flow battery operation methods.

Second Embodiment

Figure 6:
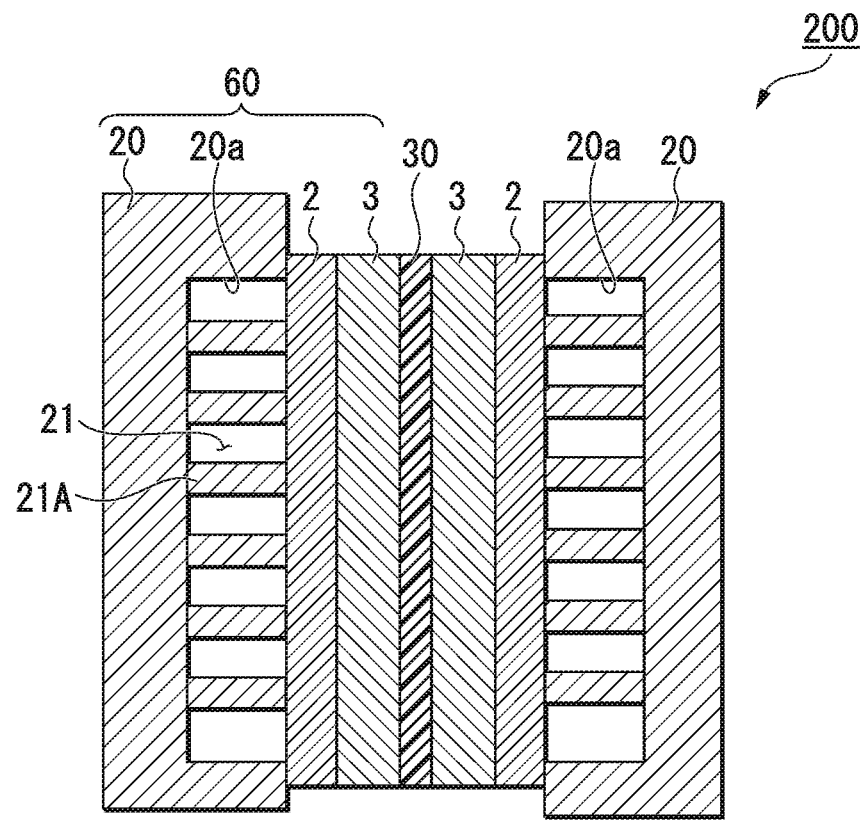
FIG. 6 is a diagram schematically illustrating a cross section of a redox flow battery comprising an electrode material according to a second embodiment of the present invention.

FIG. 6 schematically illustrates a redox flow battery 200 according to a second embodiment. In FIG. 6, redox flow battery electrodes 60, each comprising a bipolar plate 20, a conductive sheet 2 and a liquid outflow member 3, and an ion exchange membrane 30 are provided. Liquid inflow portions 21 are formed on the bipolar plates 20. The liquid inflow portions 21 are recess portions 20a formed in the bipolar plates 20, and can be provided with a structure similar to the liquid inflow members 1 in the first embodiment.

Additionally, the liquid inflow portions 21 may have support members 21A arranged therein. The arrangement of these support members 21A may be a structure similar to the support members 1A in the first embodiment. Additionally, by forming grooves in the bipolar plate 20, the portions in which grooves are not formed may serve as the support members 21A.

Additionally, in the electrode material of the second embodiment, other sheets or elements may be provided For example, a sheet having lower permeability than the liquid outflow member may be provided between the liquid outflow member and the conductive sheet. This sheet having low permeability is preferably conductive.

Additionally, a redox flow battery may be formed by using, instead of the conductive sheet 2 in the electrode material, a conductive sheet that contains only carbon nanotubes having an average fiber diameter exceeding 1 μm, or a conductive sheet that does not contain carbon nanotubes, but contains carbon fibers. However, if the conductive sheet 2 contains carbon nanotubes, it has the advantage that the Darcy permeability can easily be made lower than those of the liquid inflow member 1 and the liquid outflow member 3.

According to this structure, the liquid inflow portions 21 are formed in the bipolar plates 20. For this reason, a bipolar plate 20 in which a liquid inflow portion 21 is formed may be treated as a separate element.

Additionally, since the bipolar plate 20 has a liquid inflow portion 21, the electrolyte solution can be evenly and efficiently spread throughout the entirety of the liquid inflow portion. For this reason, the flow of the electrolyte solution in the conductive sheet 2 can be controlled to be in the direction perpendicular to the in-plane direction of the conductive sheet 2, thereby reducing the pressure drop.

The conductive sheet 2, the liquid outflow member 3 and the ion exchange membrane 30 may be made using the same structures and materials as those in the first embodiment. Additionally, the redox flow battery production method can also use the same procedure, with the sole exception that the liquid inflow member 1 is changed to the liquid inflow member 21. The liquid inflow member 21 can be produced by machining the bipolar plate 20.

While preferred embodiments of the present invention have been explained in detail above, the present invention is not limited to specific embodiments, and various modifications and changes are possible within the range of the gist of the present invention as recited in the claims.

EXAMPLES

Herebelow, examples of the present invention will be explained. The present invention is not to be construed as being limited to only the following examples.

Example 1

[Production of Samples and Measurement of Permeability]

First, first carbon nanotubes having an average fiber diameter of 150 nm and an average fiber length of 15 μm and second carbon nanotubes having an average fiber diameter of 15 nm and an average fiber length of 3 μm were mixed with purified water at proportions of respectively 90 parts by mass and 10 parts by mass with respect to a total of 100 parts by mass of the first carbon nanotubes and the second carbon nanotubes. Furthermore, 1 part by mass of polyisothianaphthene sulfonic acid, which is a water-soluble conductive macromolecular compound, was added with respect to the total of 100 parts by mass of the first carbon nanotubes and the second carbon nanotubes to produce a mixed solution. The resulting mixed solution was processed in a wet jet mill to obtain a carbon nanotube dispersion solution. Carbon fibers having an average fiber diameter of 7 μm and an average fiber length of 0.13 mm were further added to this dispersion solution, in an amount of 50 parts by mass with respect to a total of 100 parts by mass of the first and second carbon nanotubes and the carbon fibers, then stirred with a magnetic stirrer for dispersion. The dispersion solution was filtered on filter paper, dehydrated together with the filter paper, then compressed by a press and dried to produce a conductive sheet containing carbon nanotubes. The average thickness of the conductive sheet prior to assembly was 0.4 mm.

The permeability of the produced conductive sheet was evaluated by a length L different from the battery in Example 1 because the pressure differential $\Delta P$ is proportional to the length L. Thirty prepared conductive sheets were stacked, then compressed to an overall thickness of 1 cm by providing 60-mesh Ni mesh sheets comprising $\phi 0.10$ mm Ni wires on both surfaces, and measured by being loaded inside permeability measurement cells having a cross-sectional area of 1.35 $cm^2$ (width 50 mm, height 2.7 mm) and a length of 1 cm. Water (20° C., viscosity=1.002 mPa·sec) was passed through the permeability measurement cells at a transmission flux of 0.5 cm/sec, and the permeability was calculated by measuring the pressure differential (outlet pressure−inlet pressure) in the stacked conductive sheets. The permeability of the conductive sheet used in Example 1 was $2.7 \times 10^{-13}$ $m^2$.

Next, as shown in FIG. 6, grooves were formed in a bipolar plate comprising a carbon plastic molded body, and liquid inflow portions having support members were produced in the bipolar plate. The shape and arrangement of the formed liquid inflow portion overall was as shown in FIG. 5B. The size of the overall liquid inflow portion was set to 50 mm×50 mm, with two liquid inflow portions having a size of 24.5 mm×50 mm being arranged in parallel, leaving a gap having a width of 1 mm therebetween. At this time, the two liquid inflow portions had the same shape, the width of the outer frame was 1.5 mm, the width of the support members was 1 mm, the width of the first flow passage 1C was 1 mm, and the width of the second flow passages 1D was 3 mm. The thickness of the liquid inflow portion (height of the outer frame) was set to 1 mm, the height of the support member was set to 1 mm, and the upper surfaces of the outer frame and the support members were set to be coplanar.

The depth of the first flow passage and the second flow passage was 1 mm. The liquid inflow port 1B was provided at the position shown in FIG. 5B by forming a 0.8 mmϕ hole in the outer frame. A liquid feeding passage was connected to the liquid inflow port, and liquid discharge passages were provided between both side surfaces of the overall liquid inflow portion and between the two liquid inflow portions, so as to be oriented in the discharge direction illustrated in FIG. 5B. The aforementioned gap having a width of 1 mm was used to form the liquid discharge passage between the two liquid inflow portions.

The permeability of the liquid inflow portion formed in the bipolar plate was measured by providing the permeability measurement cell with the same internal structure as that of this liquid inflow portion. Water (20° C.) was passed inside the liquid inflow portion, in the in-plane direction, at a transmission flux of 2.0 cm/sec, after which the permeability was calculated by measuring the pressure differential (outlet pressure−inlet pressure) due to the same internal structure as the liquid inflow portion. The permeability in the first flow passage direction was $4.7 \times 10^{-10}$ $m^2$. In the second flow passage direction, the pressure differential at a transmission flux of 2.0 cm/sec was less than 1 kPa, which is less than the pressure differential in the first flow passage direction, and the permeability was greater than $1 \times 10^{-9}$ $m^2$. The ratio between the permeabilities of the liquid inflow member and the conductive sheet was calculated by using the value in the first flow passage direction at which the ratio was the smallest.

Furthermore, first carbon fiber (CF) paper (GDL10AA, manufactured by SGL) having porosity was prepared as the liquid outflow member. The pre-assembly average thickness of this first CF paper (CFP1) was 0.35 mm.

The permeability of the first CF paper was measured by stacking eleven 50 mm×50 mm sheets of the first CF paper, and loading the paper, while compressed in the stacking direction, into permeability measurement cells having a cross-sectional area of 1.35 $cm^2$ (width 50 mm, height 2.7 mm) and a length of 5 cm. Water (20° C.) was passed through the permeability measurement cells at a transmission flux of 0.5 cm/sec, and the permeability was calculated by measuring the pressure differential (outlet pressure−inlet pressure) due to the stacked first CF paper. The permeability of the liquid inflow member used in Example 1 was $4.1 \times 10^{-11}$ $m^2$.

[Battery Assembly]

A battery was assembled using the above-mentioned conductive sheet, a bipolar plate on which was formed a liquid inflow portion having support members, and first CF paper as the liquid outflow member. Two 24.5 mm×50 mm conductive sheets were arranged in parallel, leaving a gap of 1 mm therebetween, on two liquid inflow portions formed on the bipolar plate.

Two sheets of first CF paper were further stacked onto each conductive sheet. The sizes of the first CF paper sheets were 24.5 mm×50 mm like the liquid inflow portions, and two of these were arranged in parallel while leaving a gap of 1 mm therebetween, as with the conductive sheets.

Thus, a bipolar plate having liquid inflow portions, a conductive sheet and first CF paper were sequentially stacked to produce a redox flow battery electrode.

Furthermore, Nafion N115 (registered trademark, manufactured by DuPont) was used as an ion exchange membrane, and two electrodes comprising the above structures were respectively used as a positive electrode and a negative electrode to assemble a redox flow battery by means of a frame, a gasket, a current collector plate and a pressing plate, not shown. The post-assembly thicknesses of the conductive sheet and the first CF paper were respectively 0.31 mm and 0.24 mm.

Examples 2 and 3

In Examples 2 and 3, the mixing ratios between the first carbon nanotubes, the second carbon nanotubes and the carbon fibers contained in the conductive sheet are different from those in Example 1. The permeabilities of the conductive sheets were measured using the same method as that in Example 1. The mixing ratios were changed as indicated in Table 1.

Examples 4 and 5

Examples 4 and 5 differ from Example 1 in that a second porous sheet was provided between the liquid inflow portions and the conductive sheet. In Example 2, second CF paper (GDL25AA, manufactured by SGL) having a pre-assembly thickness of 0.21 mm was used as the second porous sheet. The post-assembly thicknesses of the conductive sheet, the first CF paper and the second CF paper (CFP2) were respectively 0.31 mm, 0.24 mm and 0.15 mm.

In Example 5, a PPS mesh (average fiber diameter 50 μm, 80 mesh) comprising a PPS (polyphenylene sulfide) resin having a pre-assembly thickness of 0.10 mm was used as the second porous sheet. The PPS mesh was placed on filter paper during the filtration step for producing the conductive sheet, and the conductive sheet was formed on the PPS mesh and integrated therewith. The carbon nanofibers and carbon fibers contained in the conductive sheet were also formed inside the holes in the PPS mesh, and conduction was possible even on the PPS-mesh-side surface. The post-assembly thicknesses of the conductive sheet integrated into the PPS mesh and the first CF paper were respectively 0.34 mm and 0.24 mm.

Examples 6-9

In Examples 6-9, the structures of the liquid inflow portions differ from that in Example 4. Example 6 had the structure in FIG. 5A. In Example 6, the sizes of the liquid inflow portion, the conductive sheet and the liquid outflow member were all 50 mm×50 mm. The width of the outer frame of the liquid inflow portion was 1.5 mm, the width of the support members was 1 mm, the width of the first flow passage was 1 mm and the width of the second flow passages was 3 mm. In Examples 7-9, the liquid inflow portion had the structure in FIG. 5B, but in Example 7, the width of the second flow passages was 1 mm. In Example 8, the width of the second flow passages was 5 mm. In Example 9, the width of the second flow passages was 7 mm.

The measurement of the liquid inflow portion permeability was performed by the same method as that in Example 1. In the first flow passage direction, the permeabilities of Examples 6, 7, 8 and 9 were respectively $2.5 \times 10^{-10}$ $m^2$, $3.2 \times 10^{-10}$ $m^2$, $5.1 \times 10^{-10}$ $m^2$ and $6.8 \times 10^{-10}$ $m^2$. The pressure differentials in the second flow passage direction were all less than 1 kPa, which is less than the pressure differential in the first flow passage direction, and the permeabilities were greater than $1 \times 10^{-9}$ $m^2$. As in Example 1, the ratio between the permeabilities of the liquid inflow member and the conductive sheet was calculated using the first flow passage direction in which the ratio was the smallest.

Additionally, the post-assembly thicknesses of the conductive sheet, the first CF paper and the second CF paper in Examples 6-9 were all the same as those in Example 4.

Example 10

Example 10 differs from Example 1 in that the liquid inflow portion is filled with third CF paper (TGP-H120, manufactured by Toray). The width of the outer frame of the liquid inflow portion was 1.5 mm, which is the same as in Example 1, but the entire interior of the outer frame was filled with the third CF paper (CFP3), without providing support members. The liquid inflow port was the same as that in Example 1. The pre-assembly thickness of the third CF paper was 0.38 mm, and three sheets were stacked and loaded into the liquid inflow portion.

The permeability of the third CF paper was measured by stacking eight 50 mm×50 mm sheets of the third CF paper, and loading the paper, while compressed in the stacking direction, into permeability measurement cells having a cross-sectional area of 1.35 cm² (width 50 mm, height 2.7 mm) and a length of 5 cm. Water (20° C.) was passed through the permeability measurement cells at a transmission flux of 0.5 cm/sec, and the permeability was calculated by measuring the pressure differential (outlet pressure–inlet pressure) due to the stacked third CF paper. The permeability was $7.1 \times 10^{-11}$ m².

Examples 11-14

In Examples 11-14, the materials constituting the liquid outflow member and the thickness thereof differ from those in Example 4. In Example 11, second CF paper (GDL25AA, manufactured by SGL) was used as the liquid outflow member. The pre-assembly average thickness of this second CF paper was 0.21 mm.

The permeability of the second CF paper was measured by stacking eighteen 50 mm×50 mm sheets of the second CF paper, and loading the paper, while compressed in the stacking direction, into permeability measurement cells having a cross-sectional area of 1.35 cm² (width 50 mm, height 2.7 mm) and a length of 5 cm. Water (20° C.) was passed through the permeability measurement cells at a transmission flux of 0.5 cm/sec, and the permeability was calculated by measuring the pressure differential (outlet pressure–inlet pressure) due to the stacked second CF paper. The permeability was $4.5 \times 10^{-11}$ m².

In Example 12, one sheet each of the first CF paper and the second CF paper were stacked to form the liquid outflow member. The pre-assembly average thickness was 0.56 mm. The permeability of this stacked sheet, as a result of calculation from the respective permeabilities and the ratio between the thicknesses of the first CF paper and the second CF paper, was $4.2 \times 10^{-11}$ m².

In Example 13, two sheets of the first CF paper were stacked to form the liquid outflow member. The pre-assembly average thickness was 0.70 mm.

In Example 14, a PPS non-woven fabric (average fiber diameter 20 μm) comprising PPS resin was used as the liquid outflow member. The pre-assembly average thickness was 0.12 mm.

The permeability of the PPS non-woven fabric was measured by stacking thirty-two 50 mm×50 mm sheets of the PPS non-woven fabric, and loading the paper, while compressed in the stacking direction, into permeability measurement cells having a cross-sectional area of 1.35 cm² (width 50 mm, height 2.7 mm) and a length of 5 cm. Water (20° C.) was passed through the permeability measurement cells at a transmission flux of 0.5 cm/sec, and the permeability was calculated by measuring the pressure differential (outlet pressure–inlet pressure) due to the PPS non-woven fabric. The permeability was $1.2 \times 10^{-10}$ m².

The post-assembly thicknesses of the conductive sheets in Examples 11-14 were all the same as in Example 4, and the thicknesses of the liquid outflow members were 0.15 mm for Example 11, 0.39 mm for Example 12, 0.48 mm for Example 13 and 0.09 mm for Example 14.

Comparative Example 1

Comparative Example 1 differs from Example 1 in that, as with conventional electrode materials, a liquid outflow member was not provided.

Comparative Example 2

Comparative Example 2 differs from Example 1 in that the liquid outflow member and the liquid inflow portions of Example 1 were not provided, the conductive sheet of Example 1 was set to a pre-assembly thickness of 3 mm at a size of 50 mm×50 mm, and the battery was assembled with a configuration such as to make the electrolyte solution flow into the conductive sheet from the entirety of one side surface and to make the electrolyte solution flow out from the entirety of the opposing surface on the other side. The post-assembly thickness of the conductive sheet was 2.7 mm.

Comparative Example 3

Comparative Example 3 differs from Example 1 in that the conductive sheet was first CF paper (GDL10AA, manufactured by SGL).

The structures of the above-described Examples 1-14 and Comparative Examples 1-3, and the pressure drops and battery properties when using each redox flow battery, are shown together in Table 1 and Table 2. As electrolyte solutions, the redox flow batteries were fed an aqueous solution containing vanadium ions (valence 4) and sulfuric acid on the positive electrode side, and an aqueous solution containing vanadium ions (valence 3) and sulfuric acid on the negative electrode side. 25 ml of each electrolyte solution was circulated by a tube pump. The flow rate of the electrolyte solution was set to 28 ml/min. The current during charging and discharging was 2 A (80 mA/cm²), the charge-stopping voltage was set to 1.75 V, and the discharge-stopping voltage was set to 1.00 V. As the battery properties, the cell resistivities and the electrical discharge capacities were measured and compared.

TABLE 1

|  |  | Example 1 | Example 2 | Example 3 | Example 4 | Example 5 |
|---|---|---|---|---|---|---|
| Liquid inflow portion | Structure | Bipolar plate recess FIG. 5B | Bipolar plate recess FIG. 5B | Bipolar plate recess FIG. 5B | Bipolar plate recess FIG. 5B | Bipolar plate recess FIG. 5B |
|  | Width (mm) of second flow passages | 3 mm | 3 mm | 3 mm | 3 mm | 3 mm |
|  | Width (mm) of support members | 1 mm | 1 mm | 1 mm | 1 mm | 1 mm |
|  | Permeability (m²) | $4.7 \times 10^{-10}$ | $4.7 \times 10^{-10}$ | $4.7 \times 10^{-10}$ | $4.7 \times 10^{-10}$ | $4.7 \times 10^{-10}$ |

TABLE 1-continued

|  |  |  |  |  |  |  |
|---|---|---|---|---|---|---|
| Second porous sheet | Type | — | — | — | CFP2 | PPS mesh |
|  | Pre-assembly thickness (mm) |  |  |  | 0.21 | 0.10 |
| Conductive Sheet | First carbon nanotube content | 90 mass pt | 90 mass pt | 90 mass pt | 90 mass pt | 90 mass pt |
|  | Second carbon nanotube content | 10 mass pt | 10 mass pt | 10 mass pt | 10 mass pt | 10 mass pt |
|  | Carbon fiber content | 50 mass pt | 10 mass pt | 85 mass pt | 50 mass pt | 50 mass pt |
|  | Permeability ($m^2$) | $2.7 \times 10^{-13}$ | $1.5 \times 10^{-13}$ | $4.1 \times 10^{-13}$ | $2.7 \times 10^{-13}$ | $2.7 \times 10^{-13}$ |
|  | Pre-assembly thickness (mm) | 0.40 | 0.40 | 0.40 | 0.40 | 0.43 |
| Liquid outflow member | Type | CFP1 | CFP1 | CFP1 | CFP1 | CFP1 |
|  | Permeability ($m^2$) | $4.1 \times 10^{-11}$ | $4.1 \times 10^{-11}$ | $4.1 \times 10^{-11}$ | $4.1 \times 10^{-11}$ | $4.1 \times 10^{-11}$ |
|  | Pre-assembly thickness (mm) | 0.35 | 0.35 | 0.35 | 0.35 | 0.35 |
|  | Post-assembly thickness (mm) | 0.24 | 0.24 | 0.24 | 0.24 | 0.24 |
| Permeability ratio | Liquid outflow portion/conductive sheet | 152 | 273 | 100 | 152 | 152 |
|  | Liquid inflow portion/conductive sheet | 1741 | 3133 | 1093 | 1741 | 1741 |
| Battery properties | Pressure drop (kPa) | 16 | 24 | 8 | 13 | 15 |
|  | Cell resistivity ($\Omega \cdot cm^2$) | 1.05 | 1.12 | 1.15 | 0.94 | 1.19 |
|  | Electrical discharge capacity (AH) | 0.993 | 0.921 | 0.939 | 1.009 | 0.955 |

|  |  | Example 6 | Example 7 | Example 8 | Example 9 | Example 10 |
|---|---|---|---|---|---|---|
| Liquid inflow portion | Structure | Bipolar plate recess FIG. 5A | Bipolar plate recess FIG. 5B | Bipolar plate recess FIG. 5B | Bipolar plate recess FIG. 5B | Bipolar plate recess + CFP3 |
|  | Width (mm) of second flow passages | 3 mm | 1 mm | 5 mm | 7 mm | — |
|  | Width (mm) of support members | 1 mm | 1 mm | 1 mm | 1 mm | — |
|  | Permeability ($m^2$) | $2.5 \times 10^{-10}$ | $3.2 \times 10^{-10}$ | $5.1 \times 10^{-10}$ | $6.8 \times 10^{-10}$ | $7.1 \times 10^{-11}$ |
| Second porous sheet | Type | CFP2 | CFP2 | CFP2 | CFP2 | — |
|  | Pre-assembly thickness (mm) | 0.21 | 0.21 | 0.21 | 0.21 |  |
| Conductive Sheet | First carbon nanotube content | 90 mass pt | 90 mass pt | 90 mass pt | 90 mass pt | 90 mass pt |
|  | Second carbon nanotube content | 10 mass pt | 10 mass pt | 10 mass pt | 10 mass pt | 10 mass pt |
|  | Carbon fiber content | 50 mass pt | 50 mass pt | 50 mass pt | 50 mass pt | 50 mass pt |
|  | Permeability ($m^2$) | $2.7 \times 10^{-13}$ | $2.7 \times 10^{-13}$ | $2.7 \times 10^{-13}$ | $2.7 \times 10^{-13}$ | $2.7 \times 10^{-13}$ |
|  | Pre-assembly thickness (mm) | 0.40 | 0.40 | 0.40 | 0.40 | 0.40 |
| Liquid outflow member | Type | CFP1 | CFP1 | CFP1 | CFP1 | CFP1 |
|  | Permeability ($m^2$) | $4.1 \times 10^{-11}$ | $4.1 \times 10^{-11}$ | $4.1 \times 10^{-11}$ | $4.1 \times 10^{-11}$ | $4.1 \times 10^{-11}$ |
|  | Pre-assembly thickness (mm) | 0.35 | 0.35 | 0.35 | 0.35 | 0.35 |
|  | Post-assembly thickness (mm) | 0.24 | 0.24 | 0.24 | 0.24 | 0.24 |
| Permeability ratio | Liquid outflow portion/conductive sheet | 152 | 152 | 152 | 152 | 152 |
|  | Liquid inflow portion/conductive sheet | 926 | 1185 | 1889 | 2519 | 263 |
| Battery properties | Pressure drop (kPa) | 42 | 18 | 12 | 11 | 16 |
|  | Cell resistivity ($\Omega \cdot cm^2$) | 1.06 | 1.02 | 0.98 | 1.14 | 1.06 |
|  | Electrical discharge capacity (AH) | 0.922 | 0.977 | 1.054 | 1.030 | 1.019 |

TABLE 2

|  |  | Example 11 | Example 12 | Example 13 | Example 14 | Comparative Example 1 | Comparative Example 2 | Comparative Example 3 |
|---|---|---|---|---|---|---|---|---|
| Liquid inflow portion | Structure | Bipolar plate recess FIG. 5B | Bipolar plate recess FIG. 5B | Bipolar plate recess FIG. 5B | Bipolar plate recess FIG. 5B | Bipolar plate recess FIG. 5B | — | Bipolar plate recess FIG. 5B |
|  | Width (mm) of second flow passages | 3 mm | 3 mm | 3 mm | 3 mm | 3 mm |  | 3 mm |
|  | Width (mm) of support members | 1 mm | 1 mm | 1 mm | 1 mm | 1 mm |  | 1 mm |
|  | Permeability ($m^2$) | $4.7 \times 10^{-10}$ | $4.7 \times 10^{-10}$ | $4.7 \times 10^{-10}$ | $4.7 \times 10^{-10}$ | $4.7 \times 10^{-10}$ |  | $4.7 \times 10^{-10}$ |
| Second porous sheet | Type | CFP2 | CFP2 | CFP2 | CFP2 | — | — | — |
|  | Pre-assembly thickness (mm) | 0.21 | 0.21 | 0.21 | 0.21 |  |  |  |
| Conductive Sheet | First carbon nanotube content | 90 mass pt | 90 mass pt | 90 mass pt | 90 mass pt | 90 mass pt | 90 mass pt | CFP1 |
|  | Second carbon nanotube content | 10 mass pt | 10 mass pt | 10 mass pt | 10 mass pt | 10 mass pt |  |  |

TABLE 2-continued

|  |  | Example 11 | Example 12 | Example 13 | Example 14 | Comparative Example 1 | Comparative Example 2 | Comparative Example 3 |
|---|---|---|---|---|---|---|---|---|
|  | Carbon fiber content | 50 mass pt | 50 mass pt | 50 mass pt | 50 mass pt | 50 mass pt | 50 mass pt |  |
|  | Permeability ($m^2$) | $2.7 \times 10^{-13}$ | $2.7 \times 10^{-13}$ | $2.7 \times 10^{-13}$ | $2.7 \times 10^{-13}$ | $2.7 \times 10^{-13}$ | $2.7 \times 10^{-13}$ | $4.1 \times 10^{-11}$ |
|  | Pre-assembly thickness (mm) | 0.4 | 0.4 | 0.4 | 0.4 | 0.4 | 3.0 | 0.35 |
| Liquid outflow member | Type | CFP2 | CFP1 + 2 | CFP1 × 2 sheets | PPS non-woven fabric | — | — | CFP1 |
|  | Permeability ($m^2$) | $4.5 \times 10^{-11}$ | $4.2 \times 10^{-11}$ | $4.1 \times 10^{-11}$ | $1.2 \times 10^{-11}$ |  |  | $4.1 \times 10^{-11}$ |
|  | Pre-assembly thickness (mm) | 0.21 | 0.56 | 0.70 | 0.12 |  |  | 0.35 |
|  | Post-assembly thickness (mm) | 0.15 | 0.39 | 0.48 | 0.09 |  |  | 0.24 |
| Permeability ratio | Liquid outflow portion/conductive sheet | 167 | 156 | 152 | 444 |  |  | 1 |
|  | Liquid inflow portion/conductive sheet | 1741 | 1741 | 1741 | 1741 | 1741 |  | 11 |
| Battery properties | Pressure drop (kPa) | 38 | 10 | 7 | 28 | >200 | >>200 | 10 |
|  | Cell resistivity ($\Omega \cdot cm^2$) | 1.01 | 1.05 | 1.23 | 1.61 | — | — | 1.96 |
|  | Electrical discharge capacity (AH) | 0.966 | 1.023 | 0.923 | 0.985 | — | — | 0.723 |

In all of Examples 1-14, the pressure drop was 50 kPa or less While a pressure drop of more than 50 kPa makes a battery unsuitable for practical use, it can be seen that all of the examples had pressure drops that were well within the practicable range. In Comparative Example 1, a flow rate of 28 mL/min was not reached even when applying a liquid-feeding pressure of 200 Pa by a pump. In Comparative Example 2, the electrolyte solution was not able to flow even when applying a liquid-feeding pressure of 200 Pa. For this reason, Comparative Examples 1 and 2 could not actually be driven as batteries, and their cell resistivities and electrical discharge capacities could not be measured. In Comparative Example 3, the conductive sheet was CF paper not containing carbon nanotubes, and good values were exhibited as pressure drop values. However, the battery properties were not sufficient. For this reason, even though the liquid inflow portions and the liquid outflow member had the same structure as that in Example 1, in Comparative Example 3, the cell resistivity was high and the electrical discharge capacity was low. In contrast therewith, Examples 1-14 all exhibited good values for the pressure drop, as mentioned above. Furthermore, compared with Comparative Example 3, it can be seen that the examples had excellent battery properties, with low cell resistivities and high electrical discharge capacities.

REFERENCE SIGNS LIST

1 Liquid inflow member
1A Support member
1B Liquid inflow port
1C First flow passage
1D Second flow passage
1E Feeding direction
2 Conductive sheet
3 Liquid outflow member
3A Outer frame
3B Liquid outflow port
3E Discharge direction
4 Third porous sheet
10 Electrode material
20 Bipolar plate
20a Recess portion
21 Liquid inflow portion
21A Support member
30 Ion exchange membrane
50, 60 Electrode of redox flow battery
100, 200 Redox flow battery

The invention claimed is:

1. An electrode material comprising:
    a conductive sheet containing carbon nanotubes having an average fiber diameter of 1 μm or less;
    a liquid inflow member that is formed on a first surface of the conductive sheet such that an electrolyte solution that is passed therethrough flows into the conductive sheet; and
    a liquid outflow member that is formed on a second surface of the conductive sheet and out of which flows the electrolyte solution that has passed through the conductive sheet;
    wherein, when using a sheet surface of the conductive sheet as a reference plane, the Darcy permeability, in an in-plane direction, inside the liquid outflow member, is at least 50 times the Darcy permeability, in a normal direction, through the conductive sheet.

2. The electrode material as claimed in claim 1, wherein the Darcy permeability, in the in-plane direction, inside the liquid inflow member, is at least 100 times the Darcy permeability, in the normal direction, through the conductive sheet.

3. The electrode material as claimed in claim 1, wherein the liquid outflow member is a first porous sheet.

4. The electrode material as claimed in claim 3, wherein the first porous sheet is conductive.

5. The electrode material as claimed in claim 3, wherein the first porous sheet is not susceptible to corrosion by the electrolyte solution.

6. The electrode material as claimed in claim 1, wherein the liquid inflow member comprises a support member that supports the conductive sheet.

7. The electrode material as claimed in claim 6, wherein the support member is arranged so as to form:
    a first flow passage through which the electrolyte solution passes from a liquid inflow port formed on one end of the liquid inflow member to another end thereof; and
    a second flow passage, connected to the first flow passage, through which the electrolyte solution flows in a direction intersecting with the first flow passage.

8. The electrode material as claimed in claim 1, wherein two or more liquid inflow members are connected to the conductive sheet.

9. The electrode material as claimed in claim 1, comprising a second porous sheet between the liquid inflow member and the conductive sheet.

10. The electrode material as claimed in claim 1, comprising a third porous sheet inside the liquid inflow member.

11. A redox flow battery electrode that uses an electrode material as claimed in claim 1.

12. The redox flow battery electrode as claimed in claim 11, wherein the liquid inflow member of the electrode material is provided on a side towards a bipolar plate, and the liquid outflow member is provided on a side towards an ion exchange membrane.

13. The redox flow battery electrode as claimed in claim 11, wherein the liquid inflow member of the electrode material is fitted into a recess portion formed on the surface on a side of the bipolar plate towards the ion exchange membrane.

14. A redox flow battery comprising a redox flow battery electrode as claimed in claim 11.

15. The electrode material as claimed in claim 1, wherein the carbon nanotubes having an average fiber diameter of 1 μm or less is a mixture of first carbon nanotubes and second carbon nanotubes;
the first carbon nanotubes have an average fiber diameter of 100 to 1000 nm;
the second carbon nanotubes have an average fiber diameter of 30 nm or less; and
a content of the second carbon nanotubes is 0.05 to 30 parts by mass with respect to a total of 100 parts by mass of the first carbon nanotubes and the second carbon nanotubes.

16. The electrode material as claimed in claim 1, wherein the conductive sheet further contains one or more conductive materials selected from the group consisting of conductive polymers, graphite and conductive carbon fibers;
a combined content of the carbon nanotubes and the one or more conductive materials contained in the conductive sheet is 80 mass % or more;
the conductive sheet contains conductive carbon fibers;
the conductive carbon fibers have an average fiber diameter greater than 1 μm; and
a content of the carbon fibers is 2 to 95 parts by mass with respect to a total of 100 parts by mass of the carbon nanotubes and the conductive carbon fibers.

17. An electrode material comprising:
a conductive sheet containing carbon nanotubes having an average fiber diameter of 1 μm or less;
a liquid inflow member that is formed on a first surface of the conductive sheet such that an electrolyte solution that is passed therethrough flows into the conductive sheet; and
a liquid outflow member that is formed on a second surface of the conductive sheet and out of which flows the electrolyte solution that has passed through the conductive sheet;
wherein, when using a sheet surface of the conductive sheet as a reference plane, the Darcy permeability, in an in-plane direction, inside the liquid inflow member, is at least 100 times the Darcy permeability, in a normal direction, through the conductive sheet.

18. The electrode material as claimed in claim 17, wherein the Darcy permeability, in the in-plane direction, inside the liquid outflow member, is at least 50 times the Darcy permeability, in the normal direction, through the conductive sheet.

19. A redox flow battery electrode that is used in a redox flow battery, comprising:
a conductive sheet containing carbon nanotubes having an average fiber diameter of 1 μm or less;
a bipolar plate that is arranged in parallel with the conductive sheet and that comprises a liquid inflow portion such that an electrolyte solution that is passed therethrough flows into the conductive sheet; and
a liquid outflow member that is arranged on the side of the conductive sheet opposite to the bipolar plate and out of which flows the electrolyte solution that has passed through the conductive sheet;
wherein, when using a sheet surface of the conductive sheet as a reference plane, the Darcy permeability, in an in-plane direction, inside the liquid outflow member, is at least 50 times the Darcy permeability, in a normal direction, through the conductive sheet.

20. A redox flow battery electrode that is used in a redox flow battery, comprising:
a conductive sheet containing carbon nanotubes having an average fiber diameter of 1 μm or less;
a bipolar plate that is arranged in parallel with the conductive sheet and that comprises a liquid inflow portion such that an electrolyte solution that is passed therethrough flows into the conductive sheet; and
a liquid outflow member that is arranged on the side of the conductive sheet opposite to the bipolar plate and out of which flows the electrolyte solution that has passed through the conductive sheet;
wherein, when using a sheet surface of the conductive sheet as a reference plane, the Darcy permeability, in an in-plane direction, inside the liquid inflow member, is at least 100 times the Darcy permeability, in a normal direction, through the conductive sheet.

* * * * *